United States Patent
Leenhouts

[11] 3,908,195
[45] Sept. 23, 1975

[54] DIGITALLY DETERMINED VELOCITY CONTROL METHOD AND MEANS FOR A DIGITAL MOTOR SYSTEM

[75] Inventor: Albert C. Leenhouts, Harwinton, Conn.

[73] Assignee: The Superior Electric Company, Bristol, Conn.

[22] Filed: Jan. 16, 1974

[21] Appl. No.: 433,844

[52] U.S. Cl. ............... 444/1; 318/696; 235/151.11; 235/150.3
[51] Int. Cl.² ................. G05B 19/40; G06F 15/46
[58] Field of Search .......... 318/685, 696, 569, 560, 318/571; 444/1; 235/151.11

[56] References Cited
UNITED STATES PATENTS
3,411,058  11/1968  Madsen et al. ............... 318/696
3,541,417  11/1970  Frank, Jr. ........................ 318/571

*Primary Examiner*—Eugene G. Botz
*Attorney, Agent, or Firm*—Ernest M. Junkins

[57] ABSTRACT

A method and system for controlling the velocity and extent of movement of a motor means that translates each pulse received essentially simultaneously into an incremental step by subdividing the movement into consecutive time intervals and determining for each interval the number of pulses and their pulse rate. The determination is preferably made by a programmed computer which maintains velocity changes between adjacent intervals to within the motor's ability to respond thereby enabling acceleration, deceleration and intermediate velocity values to be programmed to be within the ability of the motor means. The number of determinations is thus reduced while still controlling each pulse as to rate and number supplied to the motor means.

17 Claims, 4 Drawing Figures

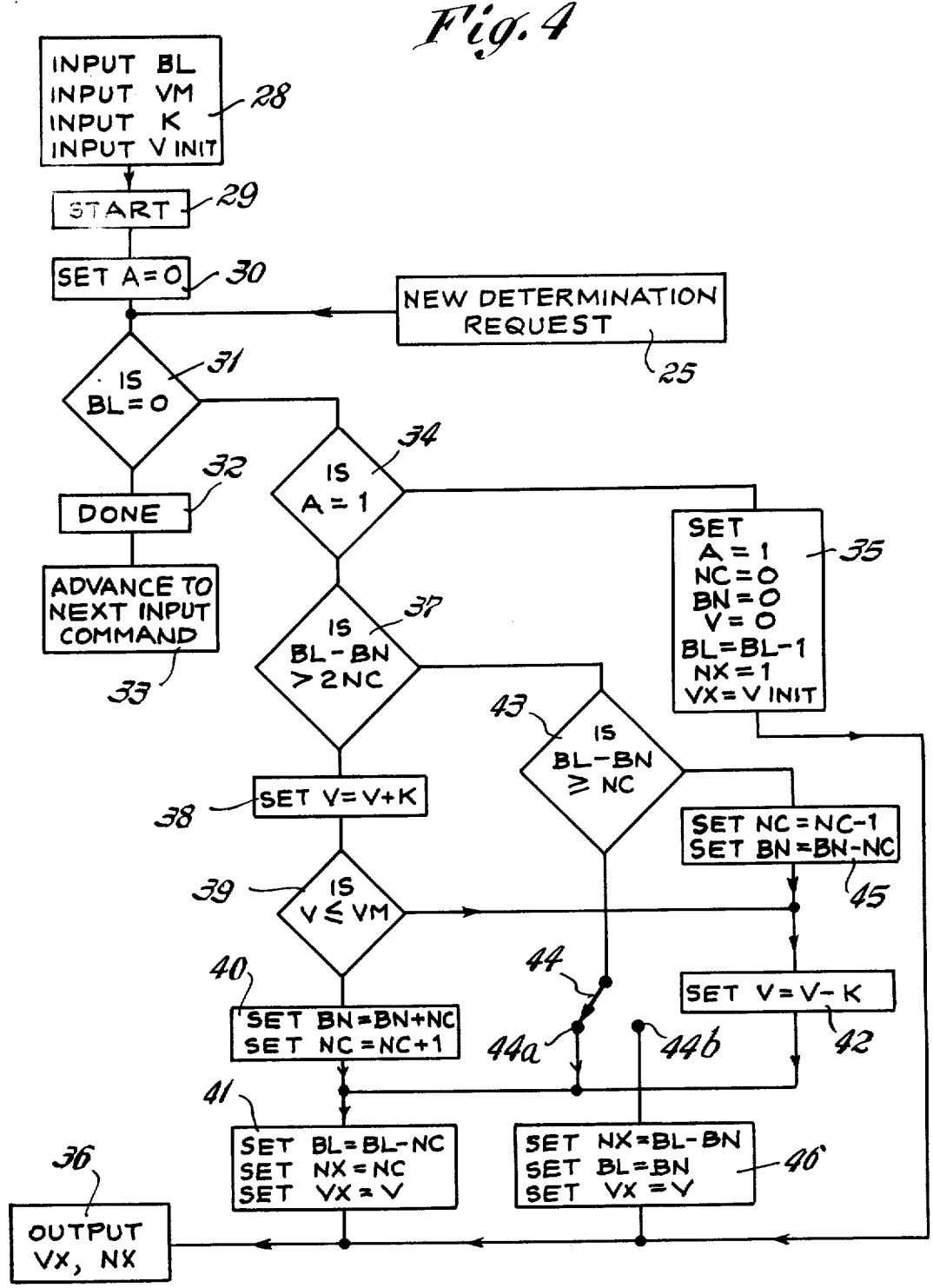

DIGITALLY DETERMINED VELOCITY CONTROL METHOD AND MEANS FOR A DIGITAL MOTOR SYSTEM

The present invention has particular utility when used in numerical control systems in which a device is moved an extent dictated by programmed instructions and especially in which the movement is digital by being produced by a motor means that translates each pulse received essentially simultaneously into an equal length step. By controlling the rate and number of pulses, the velocity and total movement of the motor means is thus obtained.

As the motor means has a finite ability to respond to each pulse, it is essential that the pulses to be supplied to the motor means within the motor means ability to respond; otherwise error is introduced by the motor means not producing a step for each pulse or losing a step. In U.S. Pat. No. 3,411,058, assigned to the assignee of the present invention, a system is disclosed for controlling the rate of pulses to a digital motor means while U.S. Pat. No. 3,553,549, also assigned to the assignee of the present invention, another system is disclosed.

While these systems have been found satisfactory they both basically depend on regulating the rate of each pulse and/or the use of analogue circuitry. With each pulse being regulated, it is thus required that a circuit essentially be dedicated full time to this regulation while an analogue circuit is inherently difficult to have its rate set or changed easily, if at all, by programmed instructions to meet different operating conditions.

It is accordingly an object of the present invention to provide a method and system for controlling the velocity and movement of a digital motor means which may utilize a programmed digital computer and instructions which programmed instructions may be used to adapt the system to different operating conditions.

Another object of the present invention is to provide a method and system that achieves the above objects with a minimum of computer time by effecting determinations or use of the computer based on time intervals normally controlling a plurality of pulses as to number and rate rather than making determinations on individual pulses.

Another object of the present invention is to provide a method and system for controlling movement of a digital motor means that utilizes a programmed computer but which only requires a relatively small quantity of computer storage, is readily adapted for use with different incremental motor means and which is relatively easily programmed but yet which maintains control as to number and rate over each pulse supplied to the motor means to produce a movement.

In carrying out the present invention, the method and system preferably employs a general purpose digital computer which is programmed according to this invention; however if desired, the system may be hard wired or fixed circuit. In either structure the information required for each movement consists of three numbers, namely the extent of the movement in incremental steps, the maximum velocity in steps per second and a value of acceleration.

The acceleration value represents a change of velocity, i.e., pulses per second that the motor means can respond to with the assurance of not losing a step. Basically it is the number of pulses per unit of time that the motor means can have its velocity changed from one speed to the next speed with the motor means having achieved the change to the new speed at the end of the time interval. If at the end of each time interval the motor means thus has a velocity equal to the pulse rate, it is translating each pulse essentially simultaneously into an incremental movement and is, thus as to velocity and position, in synchronism with the pulses.

With the above information, the computer renders a plurality of determinations with each determination supplying the number of steps (or pulses) and the pulse rate (or steps per second) aat at the motor means is to operate. During velocity changes, as when acceleration or deceleration is occurring, determinations are preferably made as frequently as the motor means can respond to the velocity changes to thereby minimize the time for the commanded movement and fully utilize the motor's ability. During constant velocity movements, determinations may be repeatedly made at constant time intervals as in one embodiment of the invention while in another embodiment the time intervals are not constant.

The determinations of the computer are supplied as a series of two sets of numbers with one of the numbers being an electrical representation of the number of pulses and the other number being an electrical representation of the rate of the pulses. Each determination is then processed by a circuit that includes a rate multiplier and a down counter into a pulse train having the number of pulses and at the rate specified by the information in the determination. The train of pulses constitutes the input to a digital motor means which is to produce a step of incremental movement for each pulse. Upon the completion of the pulse train of one determination, the circuit then requires of the computer the information of the next determination which may already have been made available and stored in a buffer storage.

The determination required of the computer for each output set is relatively simple and made much quicker than the motor means can produce the movement thereby requiring only intermittent rather than continuous use of the computer. Thus, the computer is made available for other calculations.

Other features and advantages will hereinafter appear.

Referring to the drawing:

FIG. 4 is a flow chart of the computer program used to provide the determination numbers.

Figure 1:
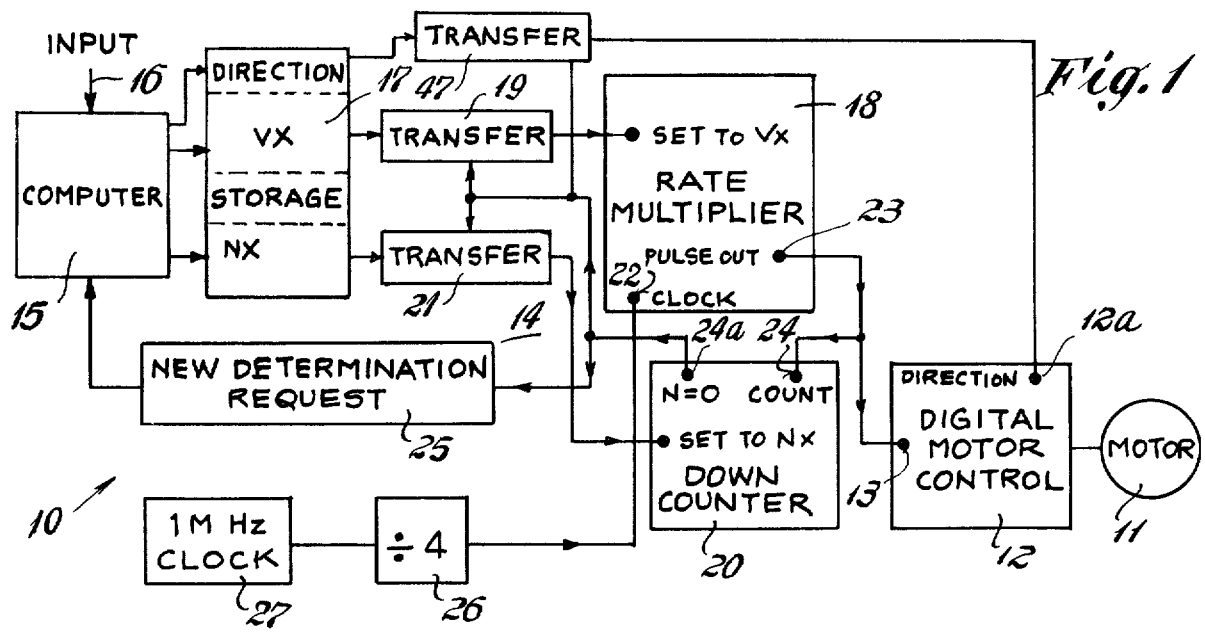
FIG. 1 is a block diagram of the processing circuit of the present invention which translates the numbers in each determination into a corrresponding train of pulses.

Referring to the drawing, the system of the present invention is generally indicated by the reference numeral 10 and is utilized to produce incremental movement by a motor 11 which has its energy controlled by a digital motor control 12, the latter accepting a pulse on an input terminal 13 to produce essentially simultaneously with the receipt thereof, the energy to the motor 11 for the motor to produce an incremental movement. The motor will thus produce an equal length movement for each pulse received on the terminal 13. The terminal 13 is connected to a processing circuit generally indicated by the reference numeral 14 which receives information from a programmed computer 15 having an input 16.

The command information on the input 16 to the computer 15 or to a dedicated hard wired circuit for a movement, consists of the number of steps the motor 11 is to take to produce the movement, the maximum velocity it is to have during the movement and an acceptable value of a change of velocity for acceleration or deceleration. The computer 15 supplies to a buffer storage 17 a number which represents for each determination the velocity in steps per second (herein denoted VX) and the number of pulses rather than a train of pulses (denoted NX) which the motor is to produce at that velocity. The velocity information VX is transferred to a rate multiplier 18 whenever a transfer block 19 is actuated while the pulse number information NX is transferred to a down counter 20 under the control of a transfer block 21 which is actuated simultaneously with the transfer block 19.

The rate multiplier has an input terminal 22 denoted "clock" and a pulse output terminal 23. The pulse output terminal is connected to the terminal 13 of the digital motor control 12 and also to a count terminal 24 of the down counter 20 which decreases its count by one for each pulse received. The down counter further has a terminal 24a denoted $N=0$ which supplies, when this condition of a zero count exists, a signal to the transfer blocks 19 and 21 and also to a block 25 the latter being a command to the computer 15 to make a new determination for supplying a new VX and a new NX to the buffer storage 17.

The clock terminal 22 of the rate multiplier is connected to the output of a divide by four block 26 which in turn is connected to a 1 million Hz clock 27 which is a pulse frequency generally obtainable from the computer 15.

With the information of VX contained within the rate multiplier and with the down counter 20 set to the number NX, the clock terminal will continually receive clock pulses at a rate of 250 KHz and will incrementally add the value of VX for each clock to itself. Every time the sum exceeds the maximum count of the multiplier, it overflows to produce an output pulse on the terminal 23 that is processed by the motor control 12 to produce a step and also reduce the count of the down counter 20 by one. The process continues until the count of the down counter 20 becomes zero at which time a new VX and NX are supplied to the rate multiplier and down counter 18 and 20, respectively, from the buffer storage 17 and a new determination request is made to the computer. The processing circuit 14 will then process this new information to produce on the pulse output terminal 23, a train of pulses at the rate commanded by the velocity information VX until the number of pulses (NX) have been produced at which time the processing circuit accepts the next determination information to be processed. The computer requires less time to make a determination than the time to process a determination and hence can make a determination at any time during a time interval, the buffer storage eliminating the need for an instantaneous determination when a request is made by the block 25.

Figure 2:
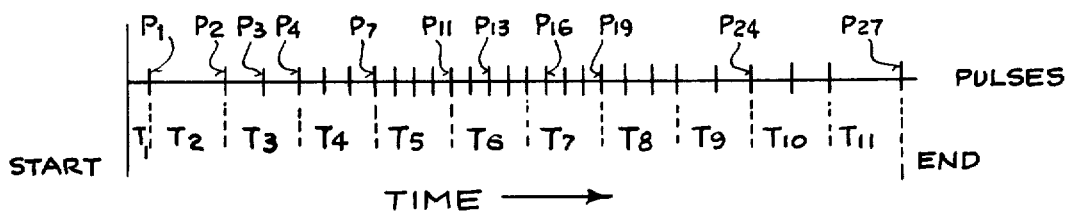
FIG. 2 is a diagrammatic representation of the train of pulses produced for one commanded movement of the motor means.

Referring to FIG. 2, there is shown a diagrammatic representation of the train of pulses that are provided to the digital motor control 12 where, as an example, the input command to the computer is that the motor move 27 steps with a maximum velocity of 800 steps per second and with the acceleration value being 200. The acceleration value is set by the capability of the motor 11 responding to a change in velocity without losing a step which in this instance would be 40,000 steps per second squared so that the motor at the end of one second of acceleration would have a velocity of 40,000 steps per second. This value is dependent upon the operating condition but in all instances is not greater than the pulse rate at which the motor 11 can start without loss of a step. Thus, with a value of 200, the motor 11 can respond to a pulse rate of 200 steps per second. Also it is considered, at least in this illustration, of remaining constant throughout the total extent of the movement.

In FIG. 2, the giving of the start command is indicated by a vertical line identified as "start" and shortly thereafter a pulse P1 appears. This is the first pulse of the pulse train and it is produced very quickly after the start command is received in order to initiate movement of the motor as soon as the command is given. In the present example, NX has a value of one and the value of VX may be a thousand or so depending upon what is selected but in any event is desirably quite rapid. Upon this information being transferred through the buffer storage to the rate multiplier 18 and the down counter 20, the multiplier 18 will produce a pulse P1 within the time T1 and the down counter 20 will again assume an $N-0$ condition.

In the next determination VX equals the acceleration value, namely 200 steps per second, while NX is again 1. The pulse P2 is then produced after the time T2. For the next time interval T3, pulses P3 and P4 are produced by determination values of $VX=400$ and $NX=2$. Upon completion of the pulses P4, the new determination has $VX=600$ and $N=3$ at which time, pulses P5, P6 and P7 are produced (some pulses are not specifically referenced in the drawing). The motor has still not attained its commanded maximum velocity of 800 steps per second and so for the next time interval T5, the determination has $VX=800$ and $NX=4$ which produces the pulses P8 through P11.

The motor has now achieved its maximum velocity and for the time intervals T6 and T7, VX will be 800 and NX will 4 so that the motor velocity is maintained at 800 steps per second for the duration of these two time intervals. At the end of interval T7, the motor control 12 has received pulse P19 which leaves eight pulses remaining to be produced and these pulses are used to provide deceleration essentially at the same change in velocity that the acceleration occurred Thus, for the interval T8, the values are $VX=600$ and NX=3 while for intervals T9 and T10, they are $VX=400$ and $NX=2$. The final pulse P27 is produced from the determination of $VX=200$ and $N=1$ and occurs during the time interval T11.

It will be evident from considering the distribution of the pulse train that except for the time T1 the time intervals T2 through T11 are identical which inherently results from the duration of the time interval being equal to NX (number of pulses) divided by VX (pulse rate) and in this embodiment is thus 5 milliseconds (0.005 seconds). Further, as soon as P1 is produced, the motor has time T2 to accelerate to 200 steps per second, which only takes one pulse, before pulses P2 and P3 require it to have a velocity of 400 steps per second. However, it has the time interval T3 to increase its velocity from 200 to 400 steps per second and the time T4 to increase its velocity from 400 to 600 and the time T5 to increase its velocity from 600 to 800.

Though the pulses in each time interval are at a constant rate, the motor must at the end of each time interval have a velocity which equals the pulse rate. However, during at least some of the interval, the pulse rate is faster than the motor from the beginning of the interval and hence the motor accelerates during the interval. Thus there is a slight lag introduced by the velocity change between a pulse an the motor response which decreases to its normal value at the end of the time interval. In no event is the lag greater than one step thus assuring that the synchronism between motor movement and pulse production at all times will be within one step.

It will also be understood that the computer can produce determination numbers in a shorter time than a time interval, and hence the computer may thus be time shared with other areas that require computation.

Referring to FIG. 4, there is shown a flow chart for programming the computer in order to produce the determination numbers used for controlling the velocity of the motor. With respect to the different abbreviations in the chart, BL represents the current movement remaining to be made and at the beginning before any steps are taken is the same as the commanded movement number (namely 27 for example given) while during the processing of the information it is reduced by one for each command pulse to maintain the number of steps remaining in the movement. VM represents the maximum velocity allowed and is input information which remains constant for the movement and which in the example given would have a value of 800 steps per second. A represents a two state device such as a flip-flop having either a 1 or a 0 state and is used for first pulse production while BN represents the count in a counter that is used to determine when deceleration should commence by maintaining a count of the minimum number of pulses that are required to decelerate. NC represents a time interval counter which maintains the count, less one, of each successive time interval and can only change its count by 1 for each time interval or determination. V represents a numerical value of the motor velocity in the determination. K represents the numerical value for the change of velocity that is within the motor's ability and which has a value of 200 in the present example. NX is the number of motor steps that is outputted for each determination while VX represents the determination velocity. The V INIT is the velocity that is used only for the first pulse P1 and is input information. The functioning of the flow chart for making the determination for the example given to produce the pulse distribution of FIG. 2, requires that in a block 28, the input information be supplied of $BL=27$, $VM=800$, $K=200$ and $V\ INIT=1000$. A start block 29 is actuated to begin processing the input information and it initially, by way of a block 30, sets A to a 0 state. The block 25 indicates that the processing circuit is ready to receive information and thus requests it. Block 31 questions if there are any steps remaining by interrogating the BL counter and if there are no steps remaining then the block 32 is actuated indicating that the movement is complete. This enables a block 33 to be acutated, if desired, to effect advancement to the next movement where the information to the processing block 28 is received for the new input command.

However, with BL equal to 27, the block 31 produces a no signal to a block 34 which inquires if the state of the A is 1 (which it is not in view of block 30) and a signal is given to do block 35 which performs the functions of setting A to its 1 state, setting the NC counter to a 0, the BN counter to 0 and the V register to 0. Further the block 35 decreases the count of the BL counter by 1 and sets NX equal to 1 and VX equal to the initial pulse velocity V INIT. This information of the first determination is ouputted by a block 36 with the pulse P1 being accordingly produced.

Upon the processing circuit 14 providing the next determination request through the block 25, the VX and NX numerical values for the time slot T2 is determined by way of blocks 31 and 34 to a block 37 which questions if the difference between the two registers BL and BN is greater than twice the time interval counter NC. As BL is numerically 26, BN is 0, and NC is 0, the information will flow to a block 38 which alters the value of V to 200 by adding K (200to the old value of V(0) and then a block 39 questions if V (now 200) is equal or less than the maximum velocity VM (800). As the answer is "yes", the insturctions in block 40 are carried out which has BN set equal to BN plus NC (both 0) while NC is set to 1 by the addition of 0 and 1.

Subsequently, by an instruction block 41, BL is decreased by the value of NC (1) to now become 25 while NX is made equal to NC (1) and VX is made equal to V (200) with these values of the determination for the time interval T2 being outputted by the block 36. Upon completion of this determination the values stored are $V=200$, $BN=0$, $NC=1$ and $BL=25$.

With the next request for the values of VX and NX for the time interval T3, the same determination is made through the blocks 34, 37, 38, 39, 40 and 41 and the block 36 outputs the values of $Vx=400$ and $NX=2$. Stored information is $V=400$, $BN=1$, $NC=2$ and $BL=23$. For the time period T4, there is outputted $VX=600$ and $NX=3$ with the stored values being $V=600$, $BN=3$, $NC=3$ and $BS=20$. The time period T5 has VX equal to 800 and NX equal to 4 with stored values of $V=800$, $BN=6$, $NC=4$ and $BL=16$. It is noted that V is now equal in value and the acceleration phase of the movement is complete.

In the determination for the time interval T6, information flows to the blocks 34, 37 and 38 to block 39 where, since V now equals 1,000 (by block 38 adding 200 to the previous V of 800 ), the information flow is directed through a block 42 which reduces the value of V by 200 (K) to a V value of 800 and then returns to the block 41. This block outputs VX as 800 and NX as 4 and at the end of the time interval T6 the values stored are $V=800$, $BN=6$, $BL=12$ and $NC=4$. This is the first time interval in which the motor is set to run at its maximum velocity.

For the time interval T7, the information flow proceeds through the block 34 and the block 37 where the question posed by this block is "no " for the first time (12 minus 6 is less than 2 times 4) and hence the flow is directed to a block 43 where the question posed by this block is answered yes (as $BL=12$, $BN=6$ and $NC=4$) which basically questions whether there are more steps remaining in the movement than are needed for deceleration. The information flow is thus directed through a switch 44 set to engage a contact 44a to the block 41. This block causes the value of BL to be shifted to a value of 8 and the values of 4 and 800 for NX and VX to be outputted by the block 36.

For the next time interval T8 at which deceleration is being effected, at the K value which is the same rate that the motor was accelerated, the information flow is again directed sequentially to the blocks 34, 37 and 43. However, at block 43 the question posed is answered no (as $BL=8$, $BN=6$ and $NC=4$) and thus the information proceeds to a block 45 which decreases the value of NC by 1 to 3 and the value of BN by the new value of NC ($6-3=3$) while the block 42 then decreases the value of V by K ( to 600). The information proceeds to the block 41 where the value of BL is decreased by NC ($8-3=5$) and the values of VX equal to 600 and NX equal to 3 are outputted by block 36. The values of $NC=3$, $BN=3$, $V=600$ and BL+5 remain in the storage registers.

For the next interval T9, which outputs pulses P23 and P24, the flow through the blocks 34, 37, 43, 45, 42 and 41 reslults in an output of $VX=4$, $NX=2$ and the values of NCequal to 2, BN equal to 1, V equal to 400 and BL equal to 3 being stored. In the determination for the time period T10, the flow is through blocks 34, 37, 43, switch 44 and block 41 with the values of VX equal to 400 and NX to 2 being outputted and the values of $BL=1$, $NC=2$, $BN=1$ and $V=400$ remaining. By reason of the question in block 43 being answered yes, only the value of BL, the number of steps remaining is altered.

For the last time period T11, the flow is through blocks 34, 37, 43, 45, 42 and 41 to output VX equal to 200 and NX equal to 1. Remaining in the register are values of $NC=1$, $BN=0$, $V=200$ and $BL=0$. Upon the next determination request, the block 31 produces the answer yes by reason of BL being equal to 0, indicating all pulses in the movement have been produced. Hence the information flows to the block 32 to indicate that the determination of the movement has been completed and which enables the movement has been completed and which enables the block 33 to request new input data for the next commanded movement.

Figure 3:
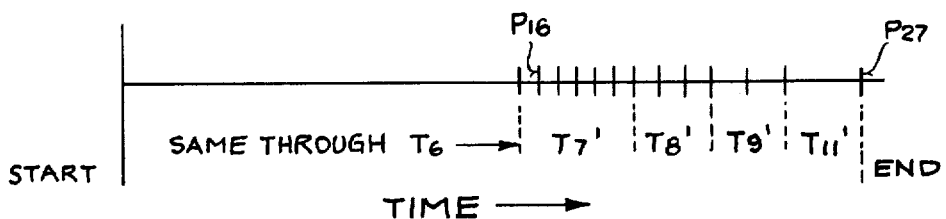
FIG. 3 is similar to FIG. 2 only showing the train of pulses produced when using a further embodiment of a computer program.

It will be understood that with the value of VX equal to the value of VM that the two odd pulses, namely P25 and P26 that occur during the time interval T10 are not needed for deceleration and that with the flow chart shown they require their own time interval and a motor movement at a slower speed than the maximum speed. To make these odd pulses be produced at the maximum speed to decrease the time for the movement and also to eliminate the need for one determination and its time interval to thus effectively render the deceleration identical with the acceleration, the flow chart may be changed by the swtich 44 being placed in contact with its terminal 44b. This results in the distrubution of the pulses shown in FIG. 3. For the first six time intervals, the pulse distribution is identical with that disclosed in FIG. 2. However, for the time interval T7' of FIG. 3 which corresponds to time interval T7, six pulses rather than four pulses are produced while the time intervals T8', T9' and T11' correspond to the intervals T8, T9 and T11 respectively and the time interval T10 is eliminated. The two odd pulses of T10 appear in T7' and thus are produced at the maximum motor speed.

Referring to the flow chart, FIG. 4, with the switch 44 contacting terminal 44b, the information for time interval T7' is processed through block 43 which finds that with BL equal to 12, BN equal to 6 and NX equal to 4 the information flows to a block 46 which outputs NX equal to the difference between BL and BN (namely 6), makes BL equal to BN and outputs the value of V, namely 800. Thus, by using this route for the determination in the flow chart, the value of BL, namely the pulses remaining to be taken is made equal to BN, the number of pulses, that are needed for deceleration and the difference therebetween is outputted to thereby accommodate for the odd pulses.

The remaining intervals T8', T9' and T11' are produced in the same manner as T8, T9 and T11, respectively.

The above determinations desire to maintain the motor movement and pulse production in synchronism within one pulse or step, though, if desired, in some instances more than one step, such as 2 steps may be advantageous. Thus, rather than incrementing NC by 1, for example in block 40 and decreasing it by 1 in block 45, the value of NC may be altered by 2 if a maximum two step lag produces a maximum acceleration and is found acceptable. One example where a 2 step lag may be advantageous is with a motor that normally has 200 steps per revolution when all windings are continually energized but if partial energization is made to occur the motor may be made to operate at 400 steps per revolution with maximum torque occuring with a two pulse to step lag or lead instead of a one pulse step lag or lead.

With respect to the embodiment shown in FIG. 2, it will be understood that the time intervals are of identical duration and this inherently results from having a constant value of K throughout the extent of the movement with a constant increment or decrement of 1 for the number of pulses in adjacent time intervals as the duration of the time interval is equal to the number of pulses divided by the pulse rate or NX divided by VX. In the embodiment shown in FIG. 3, however, by reason of the time slot T7' all time intervals are not equal in duration and hence this embodiment may be considered as having a variable time interval.

It will also be understood that, if desired, the value of K may be altered as the program progresses and may for example, depend upon a value of NC if time intervals are the determining factors with the value of K decreasing as the velocity of the motor increases to accommodate for any decrease in acceleration torque as the velocity increases. Alternatively, the value of K may be decreased by a small value for each accelerating time interval if a variable acceleration is needed. This may be accomplished by providing just prior to the block 38, a block requiring K be made equal to K-C with C being a small number such as 5 or 10. Also for deceleration there would be an opposite block ($K=K+C$) just prior to the block 42.

One form of motor means which may be employed is disclosed in the heretofore noted U.S. patent and consists of a stepping motor. However, the invention is also useable with a digitally controlled D.C. variable speed motor in which the power to the motor is obtained from recitified 60 $H_z$ source and controlled by adjustable power elements such as phase regulated controlled rectifiers. As a change in motor velocity can only be effected when the phase angle fo the controlled rectifiers is capable of being changed, the minimum time interval in which effective control may be had over the motor is the reciprocal of 120 or 0.00867 seconds and 0.0010 for 50 H₂ power. The values of K and the pulse changes between adjacent time intervals thus can be made based on such a minimum time interval. The change in the number of pulses for successive time interval may also be 1 as in the described embodiment where only a one step lag is desired or could be two or three pulses, if such a deviation is acceptable. In any event, the change is such as to assure that at the end of each time interval the motor velocity has achieved the pulse rate.

Though the value of K has been indicated as being inputted with the command information for each movement, its value is not too frequently changed and hence may be stored for use with only a different K value being inputted when needed. Also V INIT may be stored as it too is not too frequently changed, if at all.

It is also contemplated to be within the scope of the present invention to have one determination include all the pulses that are produced at the maximum velocity rather than make a plurality of determinations.

While the above only relates to the movement of the motor, its direction may be controlled as shown in FIG. 1 by a direction buffer storage block which accepts the direction command from the computer and by way of a transfer switch 47 transfers the information to a direction terminal 12a in the motor control 12.

The specific embodiment herein disclosed provides for two numbers to be supplied for each determination to control the pulses. However, as there exists for each interval the relationship of distance (number of pulses) being equal to velocity (rate of the pulses for an interval) times the duration of the interval, it will be understood that only the number for one of these factors need be supplied if the value for another of the factors is fixed. Thus for example, if the time interval is held constant, only the numerical value of the velocity or the extent of movement need be supplied, as the pulses can then be determined therefrom.

It will accordingly be understood that there has been disclosed a digital motor velocity control method and system which is adaptable for use with either a programmed computer or a dedicated circuit. The method and system depends upon the realization that the controlled motor has a finite ability to respond to a change in velocity and that commands need only be given whenever the motor is capable of changing to a new command. Any additional commands are in effect surplusage. In this manner, the number of commands is substantially reduced to many less than heretofore systems which essentially provided a command for each step the motor is to take. As each command requires a determination which in turn requires computer time, by substantially decreasing the number of determinations, the computer time is required is thus substantially minimized but still the present system is capable of not only maintaining synchronism between motor movement and pulse production to within a desired number, such as one but also provides control over each individual pulse.

Variations and modifications may be made within the scope of the claims and portions of the improvements may be used without others.

I claim:

1. A method for controlling the velocity of a motor means that translates each received pulse essentially simultaneously into an incremental movement comprising the steps of determining the change of velocity that the motor means is capable of responding to while translating every pulse into a motor movement, determining for each of a plurality of consecutive time intervals the whole number of the received pulses with there normally being a plurality of pulses in an interval, limiting the difference in the number of the received pulses between adjacent time intervals to produce no more than the determined change of velocity with the difference being a whole number of pulses and supplying the determined number of pulses at an approximately even rate during each time interval.

2. The invention as defined in claim 1 in which the step of determining includes the step of changing the number of pulses between at least some adjacent time intervals by a constant whole number of pulses.

3. The invention as defined in claim 1 in which the step of determining includes the step of changing the rate of pulses between at least some adjacent time intervals.

4. The invention as defined in claim 3 in which the step of changing the rate includes the step of making the change equal to the determined change of velocity to thereby have the change equal the motor's capability to respond.

5. The invention as defined in claim 1 in which there is the step of limiting the maximum velocity and in which the step of determining for each time interval includes the step of limiting the number of the pulses in a time interval to no more than that which would produce the maximum velocity.

6. The invention as defined in claim 1 in which the step of determining includes the step of making the minimum duration of any time interval to be no less than the time required to have the motor achieve a velocity equal to the rate of the pulses at the end of the time interval.

7. The invention as defined in claim 1 in which the step of determining includes the step of setting the rate of the pulses for each time interval.

8. The invention as defined in claim 1 in which each time interval having the same number of pulses has the same distribution of the pulses over the time interval.

9. The method for supplying information for controlling a movement of a digital motor means comprising the steps of supplying the extent of the movement as a number of steps, dividing the duration of the movement into a plurality of consecutive time intervals, determining for consecutive time intervals the whole number of steps to occur during each time interval, with the number increasing numerically by a whole number for an accelerating movement during a time interval and decreasing numerically by a whole number for a decelerating movement during a time interval as compared with the number of steps in the immediately prior time interval and making available an electrical representation of the whole number of steps for each time interval.

10. The invention as defined in claim 9 in which the step of determining includes the step of determining the rate of the number of pulses in each time interval and making available an electrical representation of the rate as a number for each time interval.

11. The invention as defined in claim 9 in which the step of determining includes the step of setting the rate by the interrelationship between the duration of the time interval and the number of steps determined for the interval.

12. A system for controlling the velocity of a motor means that produces an incremental movement essentially simultaneously with the receipt of a pulse comprising means for receiving a command of a movement consisting of a number of incremental movements and means for providing pulses to the motor means with the pulses being divided into a plurality of groups with said groups being serially supplied to said motor means and with each of said groups having a whole number of pulses and with the pulses in each group being at the same rate and in which the means for providing the pulses causes the number of pulses in a group to be made different by a whole number than the number in an adjacent group when the motor means is required to change its velocity.

13. The invention as defined in claim 12 in which means for providing the pulses causes the rate of the pulses in each group to be varied between adjacent groups when the motor means is required to change its velocity.

14. The invention as defined in claim 12 in which means for providing the pulses causes the time interval for each group to have a constant duration when the motor is changing its velocity.

15. The invention as defined in claim 12 in which the means for providing pulses may provide the same number of pulses in two different groups and in which the time distribution of the pulses in each group is the same.

16. A system for controlling the velocity of a motor means that produces an incremental movement essentially simultaneously with the receipt of a pulse comprising means for providing a first group of a whole number of pulses with the pulses having a constant rate, and means for supplying a second group of a whole number of pulses during a time duration with the pulses of the second group having a constant rate but being different from the rate of the first group, the minimum time duration for the second group being a duration which is no less than the time required for the motor means to change its velocity to the rate of the pulses in the second group.

17. The invention as defined in claim 16 in which the time duration of the second group approximates the time required for the motor means to change its velocity to the rate of the pulses in the second group.

* * * * *

REEXAMINATION CERTIFICATE (1059th)

United States Patent [19]

Leenhouts

[11] B1 3,908,195

[45] Certificate Issued May 30, 1989

[54] DIGITALLY DETERMINED VELOCITY CONTROL METHOD AND MEANS FOR A DIGITAL MOTOR SYSTEM

[75] Inventor: Albert C. Leenhouts, Harwinton, Conn.

[73] Assignee: The Superior Electric Company, Bristol, Conn.

Reexamination Request:
No. 90/000,659, Nov. 1, 1984

Reexamination Certificate for:
Patent No.: 3,908,195
Issued: Sep. 23, 1975
Appl. No.: 433,844
Filed: Jan. 16, 1974

[51] Int. Cl.⁴ .................. G05B 19/40; G06F 15/46
[52] U.S. Cl. .................. 364/300; 364/130; 364/174; 364/400; 318/696
[58] Field of Search .................. 364/148–150, 364/167–168, 170, 176, 30, 130, 174, 400; 318/183, 569–570, 600, 603, 696

[56] References Cited

U.S. PATENT DOCUMENTS

| | | | |
|---|---|---|---|
| 2,706,270 | 4/1955 | Steele | 318/283 |
| 3,065,397 | 11/1962 | Crawford | 318/231 |
| 3,070,301 | 12/1962 | Sarnoff | 235/151 |
| 3,173,001 | 3/1965 | Evans | 235/154 |
| 3,184,663 | 5/1965 | Mergler | 318/39 |
| 3,191,111 | 6/1965 | Greene | 318/162 |
| 3,382,352 | 5/1968 | Yetter | 235/151.1 |
| 3,443,178 | 5/1969 | Reuteler | 318/18 |
| 3,466,517 | 9/1969 | Leenhouts | 318/18 |
| 3,475,667 | 10/1969 | Newell | 318/138 |
| 3,486,093 | 12/1969 | McArthur | 318/102 |
| 3,573,737 | 4/1971 | Rosenberg | 340/172.5 |
| 3,579,279 | 5/1971 | Inaba et al. | 318/696 |
| 3,582,629 | 6/1971 | Ross | 235/151.1 |
| 3,597,593 | 8/1971 | Stanesby et al. | 235/61.6 |
| 3,605,000 | 9/1971 | Inaba et al. | 318/619 |
| 3,611,102 | 10/1971 | Leenhouts | 318/696 |
| 3,629,560 | 12/1971 | Slawson | 235/151.11 |
| 3,665,279 | 5/1972 | McIntosh | 318/571 |
| 3,725,654 | 4/1973 | Tripp | 235/151.11 |
| 3,729,623 | 4/1973 | Kelling | 235/151.11 |
| 3,732,480 | 5/1973 | Hendrickson et al. | 318/696 |
| 3,735,104 | 1/1973 | Holmgren | 235/151.11 |
| 3,767,990 | 10/1973 | Kreithen et al. | 318/573 |
| 3,793,511 | 2/1974 | Bala et al. | 235/151.11 |
| 3,818,261 | 6/1974 | Clarke, Jr. | 318/696 |
| 3,828,168 | 8/1974 | O'Callaghan et al. | 235/150.1 |
| 3,887,796 | 6/1975 | Trousdale et al. | 235/151 |
| 3,893,616 | 7/1975 | Trousdale | 235/151 |
| 3,904,858 | 9/1975 | Rosshirt | 235/151.11 |
| 3,941,988 | 3/1976 | Hagstrom | 364/168 X |
| 4,123,750 | 10/1978 | Leney et al. | 340/347 P |

OTHER PUBLICATIONS

"'Celerate, The Digital Stepping Motor", *Electronic Design 1*, Jan. 4, 1973.
*IBM Technical Disclosure Bulletin*, vol. 13, No. 3, p. 689 et seq.
Fredricksen, "Direct Digital Processor Control of Stepping Motors", *IBM Journal*, Mar. 1967, pp. 179–188.
Sajeva et al., "Digital Pulse Generator for Nuclear Magnetic Resonance Experiments", Nuclear Instruments and Methods, vol. 106, 1973, pp. 549–555.
LaLanne et al., "A Programmable Impulse Generator for Spin-Lattice Relaxation Time Measurements in High Resolution NMR", The Review of Scientific Instruments, Jan. 1970.
Fredriksen, "Design of Digital Control Systems With Step Motors", *Proceedings of 1972 Symposium on Incremental Motion Control Systems and Devices*.
Thomas et al., "The Power Stepping Motor—A New Digital Activator", *Control Engineering*, Jan. 1957.

*Primary Examiner*—David H. Malzahn

[57] ABSTRACT

A method and system for controlling the velocity and extent of movement of a motor means that translates each pulse received essentially simultaneously into an incremental step by subdividing the movement into consecutive time intervals and determining for each interval the number of pulses and their pulse rate. The determination is preferably made by a programmed computer which maintains velocity changes between adjacent intervals to within the motor's ability to respond thereby enabling acceleration, deceleration and intermediate velocity values to be programmed to be within the ability of the motor means. The number of determinations is thus reduced while still controlling each pulse as to rate and number supplied to the motor means.

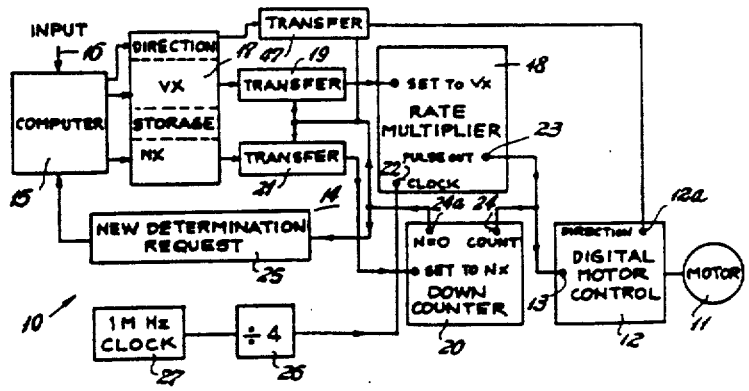

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 13-23:

As the motor means has a finite ability to respond to each pulse, it is essential that the pulses [to] be supplied to the motor means within the motor means ability to respond; otherwise error is introduced by the motor means not producing a step for each pulse or losing a step. In U.S. Pat. No. 3,411,058, assigned to the assignee of the present invention, a system is disclosed for controlling the rate of pulses to a digital motor means while *in* U.S. Pat. No. 3,553,549, also assigned to the assignee of the present invention, another system is disclosed.

Column 1, lines 32-37:

It is accordingly an object of the present invention to provide a method and system for controlling the velocity and movement of a digital motor means which may utilize a programmed digital computer and [instructions] *in* which programmed instructions may be used to adapt the system to different operating conditions.

Column 1, lines 54-62:

In carrying out the present invention, the method and system preferably employs a general purpose digital computer which is programmed according to this invention; however if desired, the system may be *a* hard wired or fixed circuit. In either structure the information required for each movement consists of three numbers, namely the extent of the movement in incremental steps, the maximum velocity in steps per second and a value of acceleration.

Column 2, lines 8-21:

With the above information, the computer renders a plurality of determinations with each determination supplying the number of steps (or pulses) and the pulse rate (or steps per second) [att at] *that* the motor means is to operate. During velocity changes, as when acceleration or deceleration is occurring, determinations are preferably made as frequently as the motor means can respond to the velocity changes to thereby minimize the time for the commanded movement and fully utilize the motor's ability. During constant velocity movements, determinations may be repeatedly made at constant time intervals as in one embodiment of the invention while in another embodiment the time intervals are not constant.

Column 3, lines 23-34:

The rate multiplier has an input terminal 22 denoted "clock" and a pulse output terminal 23. The pulse outputterminal is connected to the terminal 13 of the digital motor control 12 and also to a count terminal 24 of the down counter 20 which decreases its count by one for each pulse received. The down counter further has a terminal 24a denoted N=0 which supplies, when this condition of a zero count exists, a signal to the *two* transfer blocks 19 and 21 and also to a block 25 the latter being a command to the computer 15 to make a new determination for supplying a new VX and a new NX to the buffer storage 17.

Column 3, lines 40-66:

With the information of VX contained within the rate multiplier and with the down counter 20 set to the number NX, the clock terminal will continually receive clock pulses at a rate of 250 KHz and will incrementally add the value of VX for each clock *pulse* to itself. Every time the sum exceeds the maximum count of the multiplier, it overflows to produce an output pulse on the terminal 23 that is processedby the motor control 12 to produce a step and also reduce the count of the down counter 20 by one. The process continues until the count of the down counter 20 becomes zero at which time a new VX and NX are supplied to the rate multiplier and down counter 18 and 20, respectively, from the buffer storage 17 and a new determination request is made to the computer. The processing circuit 14 will then process this new information to produce on the pulse output terminal 23, a train of pulses at the rate commanded by the velocity information VX until the number of pulses (NX) have been produced at which time the processing circuit accepts the next determination information to be processed. The computer requires less time to make a determination than the time to process a determination and hence can make a determination at any time during a time interval, the buffer storage eliminating the need for an instantaneous determination when a request is made by the block 25.

Column 5, lines 6-18:

Though the pulses in each time interval are at a constant rate, the motor must at the end of each time interval have a velocity which equals the pulse rate. However, during at least some of the interval, the pulse rate is faster than the motor from the beginning of the interval and hence the motor accelerates during the interval. Thus there is a slight lag introduced by the velocity change between a pulse [an] *and* the motor response which decreases to its normal value at the end of the time interval. In no event is the lag greater than one step thus assuring that the synchronism between motor movement and pulse production at all times will be within one step.

Column 6, lines 14-27:

Upon the processing circuit 14 providing the next determination request through the block 25, the VX and NX numerical values for the time slot T2 is determined by way of blocks 31 and 34 to a block 37 which questions if the difference between the two registers BL and BN is greaterthan twice the time interval counter NC. As BL is numerically 26, BN is 0, and NC is 0, the information will flow to a block 38 which alters the value of V to 200 by adding K (200 to the old value of V(0) and then a block 39 questions if V (now 200) is equal *to* or less than the maximum velocity VM (800). As the answer is "yes", the [insturctions] *instructions* in block 40 are carried out which has BN set equal to BN plus NC (both 0) *so BN remains 0* while NC is set to 1 by the addition of 0 and 1.

Column 6, lines 35–46:

With the next request for the values of VX and NX for the time interval T3, the same determination is made through the blocks 34, 37, 38, 39, 40 and 41 and the block 36 outputs the values of VX=400 and NX=2. Stored information is V=400, BN=1, NC=2 and BL=23. For the time period T4, there is outputted VX=600 and NX=3 with the stored values being V=600, BN=3, NC=3 and [BS] *BL*=20. The time period T5 has VX equal to 800 and NX equal to 4 with stored values of V=800, BN=6, NC=4 and BL=16. It is noted that V is now equal *to VM* in value and the acceleration phase of the movement is complete.

Column 6, line 59 through Column 7, line 3:

For the time interval T7, the information flow proceeds through the block 34 and the block 37 where the question posed by this block is "no" for the first time (12 minus 6 is less than 2 times 4) and hence the flow is directed to a block 43 where the question posed by this block is answered [yes] *"yes"* (as BL=12, BN=6 and NC=4) which basically questions whether there are more steps remaining in the movement than are needed for deceleration. The information flow is thus directed through a switch 44 set to engage a contact 44a to the block 41. This block causes the value of BL to be shifted to a value of 8 and the values of 4 and 800 for NX and VX to be outputted by the block 36.

Column 7, lines 4–18:

For the next time interval T8 at which deceleration being effected, at the K value which is the same rate that the motor was accelerated, the information flow is again directed sequentially to the blocks 34, 37 and 43. However, at block 43 the question posed is answered [no] *"no"* (as BL=8, BN=6 and NC=4) and thus the information proceeds to a block 45 which decreases the value of NC by 1 to 3 and the value of BN by the new value of NC (6−3=3) while the block 42 then decreases the value of V by K (to 600). The information proceeds to the block 41 where the value of BL is decreased by NC (8−3=5) and the values of VX equal to 600 and NX equal to 3 are outputted by block 36. The values of NC=3, BN=3, V=600 and [BL+5] *BL=5* remain in the storage registers.

Column 7, lines 19–30:

For the next interval T9, which outputs pulses P23 and P24, the flow through the blocks 34, 37, 43, 45, 42 and 41 *results* [resluts] in an output of VX=4, NX=2 and the values of NC equal to 2, BN equal to 1, V equal to 400 and BL equal to 3 being stored. In the determination for the time period T10, the flow is through blocks 34, 37, 43, switch 44 and block 41 with the values of VX equal to 400 and NX to 2 being outputted and the values of BL=1, NC=2, BN=1 and V=400 remaining. By reason of the question in block 43 being answered yes, only the value of BL, the number of steps remaining is altered.

Column 7, lines 31–42:

For the last time period T11, the flow is through blocks 34, 37, 43, 45, 42 and 41 to output VX equal to 200 and NX equal to 1. Remaining in the register are values of NC=1, BN=0, V=200 and BL=0. Upon the next determination request, the block 31 produces the answer yes by reason of BL being equal to 0, indicating all pulses in the movement have been produced. Hence the information flows to the block 32 to indicate that the determination of [the movement has been completed and which enables] the movement has been completed and which enables the block 33 to request new input data for the next commanded movement.

Column 8, lines 14–29:

The above determinations desire to maintain the motor movement and pulse production in synchronism within one pulse or step, though, if desired, in some instances more than one step, such as 2 steps may be advantageous. Thus, rather than incrementing NC by 1, for example in block 40 and decreasing it by 1 in block 45, the value of NC may be altered by 2 if a maximum two step lag produces a maximum acceleration and is found acceptable. One example where a 2 step lag may be advantageous is with a motor that normally has 200 steps per revolution when all windings are continually energized but if partial energization is made to occur the motor may be made to operate at 400 steps per revolution with maximum torque [occuring] *occurring* with a two pulse to step lag or lead instead of a one pulse *to* step lag or lead.

Column 8, line 56 through Column 9, line 10:

One form of motor means which may be employed is disclosed in the heretofore noted U.S. patent and consists of a stepping motor. However, the invention is also useable with a digitally controlled D.C. variable speed motor in which the power to the motor is obtained from rectified 60 $H_z$ source and controlled by adjustable power elements such as phase regulated controlled rectifiers. As a change in motor velocity can only be effected when the phase angle [fo] *of* the controlled rectifiers is capable of being changed, the minimum time interval in which effective control may be had over the motor is the receprocal of 120 or 0.00867 seconds and 0.0010 for 50 $H_z$ power. The values of K and the pulse changes between adjacent time intervals thus can be made based on such a minimum time interval. The change in the number of pulses for successive time interval may also be 1 as in the described embodiment where only a one step lag is desired or could be two or three pulses, if such a deviation is acceptable. In any event, the change is such as to assure that at the end of each time interval the motor velocity has achieved the pulse rate.

Column 9, lines 38–58:

It will accordingly be understood that there has been disclosed a digital motor velocity control method and system which is adaptable for use with either a programmed computer or a dedicated circuit. The method and system depends upon the realization that the controlled motor has a finite ability to respond to a change in velocity and that commands need only be given whenever the motor is capable of changing to a new command. Any additional commands are in effect surplusage. In this manner, the number of commands is substantially reduced to many less than heretofore systems which essentially provided a command for each step the motor is to take. As each command requires a determination which in turn requires computer time, by substantially decreasing the number of determinations, the computer time [is] required is thus substantially minimized but still the present system is capable of not only maintaining synchronism between motor movement and pulse production to within a desired number, such as one but also provides control over each individual pulse.

AS A RESULT OF REEXAMINATION, IT HAS BEEN DETERMINED THAT:

Claims 1–17 are cancelled.

New claims 18–190 are added and determined to be patentable.

18. A method for controlling the velocity of a motor means that translates each received pulse into an incremental movement, comprising the steps of:
   (1) receiving input information regarding:
      (a) a whole number (BL) representing the desired amount of movement of the motor means in terms of the whole number of pulses to be transferred to the motor means, and
      (b) at least one value representing the maximum change in velocity (i.e., acceleration or deceleration) that the motor means is capable of responding to while translating every received pulse into an incremental motor means movement, this change in velocity called K;
   (2) initializing to zero the number of pulses necessary to decelerate the motor means (BN) and the number of time intervals for which there has been acceleration of the motor means (NC);
   (3) generating a plurality of time intervals, each interval having a duration so that at least one pulse, and generally a plurality of pulses, are transferred to the motor means during each interval;
   (4) if the value of BL is greater than zero, determining the whole number of pulses (NX) and the pulse rate (VX) of these pulses to transfer to the motor means during each time interval by performing the following substeps:
      (a) determining if the number of pulses remaining to be transferred to the motor means (i.e., BL) minus the number of pulses necessary to decelerate the motor means (BN) is greater than at least a constant (where the constant has a value equal or greater than one) times the number of time intervals for which there has been acceleration of the motor means (NC), and if so, increasing the pulse velocity (VX) by the current value of K, increasing the value of BN by the value of NC and then increasing the value of NC by one, decreasing the value of BL by the new value of NC, and setting the number of pulses (NX) for the next interval to the value of NC so that the motor means is accelerated by the new value of NX at a pulse velocity of VX,
      (b) if the value of BL minus BN is not greater than said constant times NC but is greater than NC, setting the number of pulses (NX) for the next interval to the value of BL minus BN, maintaining the last determined pulse velocity VX, and then setting the value of BL to the value of BN, and
      (c) if the value of BL minus BN is less than NC, decreasing the value of NC by one and then decreasing the value of BN by the new value of NC, decreasing the pulse velocity (VX) by the current value of K, decreasing the value of BL by the value of NC and setting the number of pulses (NX) for the next interval to the value of NC so that the motor means is decelerated by the new value of NX; and
   (5) transferring to the motor means for each time interval the determined whole number of pulses equal to the value of NX at a pulse rate of VX;
whereby the motor means is accelerated during one or more time intervals, wherein the change in pulse velocity during each time interval is within the maximum change in velocity value of the motor means, and wherein said acceleration continues until the amount of counts remaining to be sent to the motor means minus the number of pulses necessary to decelerate the motor means is less than said constant times the number of time intervals during which acceleration has taken place, and wherein the pulse rate is maintained until a number of pulses equal to the then difference in value between BL and BN is transferred to the motor means and wherein the motor means is then decelerated until no further pulses are present for transfer to the motor means.

19. A method for controlling the velocity of a motor means as defined in claim 18, wherein a single value represents the maximum change in velocity that the motor means is capable of responding to while translating every received pulse into an incremental motor means movement.

20. A method for controlling the velocity of a motor means as defined in claim 19, wherein the step of receiving input information further receives information for a number (VM) representing the maximum velocity that the motor means can respond to while being capable for translating every received pulse into an incremental motor movement, and further, wherein at Step 4(a) wherein the pulse velocity (VX) is increased by the current value of K, if said value is greater than VM, then maintaining the pulse velocity (VX) at its previous value and further maintaining the previous value of BN and NC, rather than increasing the value of BN by the value of NC and incrementing by one the value of NC; whereby the pulse velocity is increased if BL minus BN is greater than the multiple times NC provided that the determined pulse velocity does not exceed the maximum velocity that the motor means is capable for responding to while translating every received pulse into an incremental motor movement.

21. A method for controlling the velocity of a motor means as defined in claim 20, wherein the constant times the number of time intervals for which there has been acceleration of the motor means (NC) is equal to the value 2.

22. A method for controlling the velocity of a motor means as defined in claim 21, wherein the transferring to the motor means for each time interval the number of pulses equal to the value of NX at a pulse rate of VX is performed by the following substeps:
   (a) transferring to a rate multiplier a number associated with the pulse velocity VX and transferring to a down counter the number of pulses equal to NX,
   (b) generating a pulse out signal from the rate multiplier when the number of pulses received from a clock signal, times the value of VX, exceeds a maximum count of the rate multiplier and transferring this pulse out signal to a digital motor control for generating a pulse to the motor means, as well as transferring this pulse out signal to the down counter so as to decrement by one the value of the count within the down counter as originally established by NX, and
   (c) continuing Step b until the value in the down counter is equal to zero at which time further output signals

*from the rate multiplier are terminated for that time interval.*

23. A method for controlling the velocity of a motor means as defined in claim 22, wherein the transferring to the rate multiplier a number associated with VX and transferring to the down counter a number equal to NX is obtained from a buffer storage.

24. A method for controlling the velocity of a motor means as defined in claim 22, wherein a digital computer performs at least Steps 2 and 4.

25. A method for controlling the velocity of a motor means as defined in claim 24, wherein the transferring to the rate multiplier a number associated with VX and transferring to the down counter a number equal to NX is obtained from a buffer storage.

26. A method for controlling the velocity of a motor means as defined in claim 24, wherein if the value of BL equals zero, ascertaining if a new movement of the motor means is desired and if so, receiving information regarding such desired motor movement (a new value for BL).

27. A method for controlling the velocity of a motor means as defined in claim 26, wherein the transferring to the rate multiplier a number associated with VX and transferring to the down counter a number equal to NX is obtained from a buffer storage.

28. A method for controlling the velocity of a motor means as defined in claim 21, further comprising the step of receiving input information regarding a number ($V_{INIT}$) representing the initial motor means velocity and wherein the initializing of a plurality of variables used in the determination of the number of pulses generated during any given time interval further comprises initializing the value of VX to the value of $V_{INIT}$ and transferring a pulse to the motor means during a first-time interval having a duration so that a first pulse has a pulse velocity of $V_{INIT}$; and further wherein the value of BL is decreased by one; whereby an initial velocity equal to the value of $V_{INIT}$ is obtained by presenting a pulse to the motor to the motor means during a first-time interval.

29. A method for controlling the velocity of a motor means as defined in claim 28, wherein the transferring to the motor means for each time interval the number of pulses equal to the value of NX at the pulse rate of VX is performed by the following substeps:
   (a) transferring to a rate multiplier a number associated with the pulse velocity VX and transferring to a downcounter the number of pulses equal to NX,
   (b) generating a pulse out signal from the rate multiplier when the number of pulses received from a clock signal, times the value of VX, exceeds a maximum count of the rate multiplier and transferring this pulse out signal to a digital motor control for generating a pulse to the motor means, as well as transferring this pulse out signal to the down counter so as to decrement by one the value of the count within the down counter as originally established by NX, and
   (c) continuing step b until the value in the downcounter is equal to zero at which time further output signals from the rate multiplier are terminated for that time interval.

30. A method for controlling the velocity of a motor means as defined in claim 29, wherein a computer performs at least Steps 2 and 4.

31. A method for controlling the velocity of a motor means as defined in claim 30, wherein the transferring to the rate multiplier a number associated with VX and transferring to the down counter a number equal to NX is obtained from a buffer storage.

32. A method for controlling the velocity of a motor means as defined in claim 30, wherein if the value of BL is equal to zero, then ascertaining if a new movement of the motor means is desired and if so, receiving information regarding such desired motor movement (a new value for BL).

33. A method for controlling the velocity of a motor means as defined in claim 18, wherein the maximum change in velocity (i.e., K) varies for each determination of NX and VX for each of the plurality of time intervals for which there is acceleration or deceleration of the motor means.

34. A method for controlling the velocity of a motor means as defined in claim 33, wherein the maximum change in velocity (i.e., K) is reevaluated each time the pulse velocity (VX) is changed wherein for acceleration of the motor means, the new value of K is equal to the previous value of K minus a constant and wherein for deceleration of the motor means the new value of K is equal to the previous value of K plus a constant.

35. A method for controlling the velocity of a motor means as defined in claim 18, wherein the value of K is a function of the number of time intervals for which there has been acceleration of the motor means (i.e., variable NC).

36. A method for controlling the velocity of a motor means as defined in claim 35, wherein the function of variable NC is negative in sign so that the value of K during time intervals for which there is acceleration is decreased for each such time interval in order to accommodate for any decrease in the acceleration torque of the motor means as the velocity of the motor means increases.

37. A method for controlling the velocity of a motor means as defined in claim 18, wherein the step of receiving input information further receives information for a number (VM) representing the maximum velocity that the motor means can respond to while being capable for translating every received pulse into an incremental motor movement, and further, at Step 4(a) wherein the pulse velocity (VX) is increased by the current value of K, if said new VX value is greater than VM, then maintaining the pulse velocity (VX) at its previous value and further maintaining the previous values of BN and NC, rather than increasing the value of BN by the value of NC and incrementing by one the value of NC; whereby the pulse velocity is increased if BL minus BN is greater than the constant times NC provided that the determined pulse velocity does not exceed the maximum velocity that the motor means is capable of responding to while translating every received pulse into an incremental motor movement.

38. A method for controlling the velocity of a motor means as defined in claim 37, wherein the transferring to the motor means for each time interval the number of pulses equal to the value of NX at a pulse rate of VX is performed by the following substeps:
   (a) transferring to a rate multiplier a number associated with the pulse velocity VX and transferring to a downcounter the number of pulses equal to NX,
   (b) generating a pulse out signal from the rate multiplier when the number of pulses received from a clock signal, times the value of VX, exceeds a maximum count of the rate multiplier and transferring this pulse out signal to a digital motor control for generating a pulse to the motor means, as well as transferring this pulse out signal to the down counter so as to decrement by one the value of the count within the down counter as originally established by NX, and
   (c) continuing Step b until the value in the downcounter is equal to zero at which time further output signals

*from the rate multiplier are terminated for that time interval.*

39. A method for controlling the velocity of a motor means as defined in claim 38, wherein a computer performs at least Steps 2 and 4.

40. A method for controlling the velocity of a motor means as defined in claim 39, wherein the transferring to the rate multiplier a number associated with VX and transferring to the down counter a number equal to NX is obtained from a buffer storage.

41. A method for controlling the velocity of a motor means as defined in claim 39, wherein if the value of BL is equal to zero, then ascertaining if a new movement of the motor means is desired and if so, receiving information regarding such desired motor movement (a new value for BL).

42. A method for controlling the velocity of a motor means as defined in claim 41, wherein the maximum change in velocity (i.e., K) varies for each determination of NX and VX for each of the plurality of time intervals for which there is acceleration or deceleration of the motor means.

43. A method for controlling the velocity of a motor means as defined in claim 41, wherein the maximum change in velocity (i.e., K) is reevaluated each time the pulse velocity (VX) is changed wherein for acceleration of the motor means, the new value of K is equal to the previous value of K minus a constant and wherein for deceleration of the motor means the new value of K is equal to the previous value of K plus a constant.

44. A method for controlling the velocity of a motor means as defined in claim 41, wherein the value of K is a function of the number of time intervals for which there has been acceleration of the motor means (i.e., variable NC).

45. A method for controlling the velocity of a motor means as defined in claim 44, wherein the function of variable NC is negative in sign so that the value of K during time intervals for which there is acceleration is decreased for each such time interval in order to accommodate for any decrease in the acceleration torque of the motor means as the velocity of the motor means increases.

46. A method for controlling the velocity of a motor means as defined in claim 18, wherein the constant times the number of time intervals for which there has been acceleration of the motor means (NC) is equal to the value 2.

47. A method for controlling the velocity of a motor means as defined in claim 46, wherein the transferring to the motor means for each time interval the number of pulses equal to the value of NX at a pulse rate of VX is performed by the following substeps:
  (a) transferring to a rate multiplier a number associated with the pulse velocity VX and transferring to a downcounter the number of pulses equal to NX,
  (b) generating a pulse out signal from the rate multiplier when the number of pulses received from a clock signal, times the value of VX, exceeds a maximum count of the rate multiplier and transferring this pulse out signal to a digital motor control for generating a pulse to the motor means, as well as transferring this pulse out signal to the down counter so as to decrement by one the value of the count within the down counter as originally established by NX, and
  (c) continuing Step b until the value in the downcounter is equal to zero at which time further output signals from the rate multiplier are terminated for that time interval.

48. A method for controlling the velocity of a motor means as defined in claim 47, wherein a computer performs at least Steps 2 and 4.

49. A method for controlling the velocity of a motor means as defined in claim 48, wherein if the value of BL is equal to zero, then ascertaining if a new movement of the motor means is desired and if so, receiving information regarding such desired motor movement (a new value for BL).

50. A method for controlling the velocity of a motor means as defined in claim 18, further comprising the step of receiving input information regard a number ($V_{INIT}$) representing the initial motor means velocity and wherein the initializing of a plurality of variables used in the determination of the number of pulses generated during any given time interval, further comprises initializing the value VX to the value of $V_{INIT}$ and transferring said pulse to the motor means during a first-time interval and further, wherein the value of BL is decreased by one; whereby an initial velocity equal to the value of $V_{INIT}$ is obtained by presenting a pulse to the motor means during a first-time interval.

51. A method for controlling the velocity of a motor means as defined in claim 50, wherein the transferring to the motor means for each time interval the number of pulses equal to the value of NX at a pulse rate of VX is performed by the following substep:
  (a) transferring to a rate multiplier a number associated with the pulse velocity VX and transferring to a downcounter the number of pulses equal to NX,
  (b) generating a pulse out signal from the rate multiplier when the number of pulses received from a clock signal, times the value of VX, exceeds a maximum count of the rate multiplier and transferring this pulse out signal to a digital motor control for generating a pulse to the motor means, as well as transferring this pulse out signal to the down counter so as to decrement by one the value of the count within the down counter as originally established by NX, and
  (c) continuing Step b until the value in the downcounter is equal to zero at which time further output signals from the rate multiplier are terminated for that time interval.

52. A method for controlling the velocity of a motor means as defined in claim 51, wherein a computer performs at least Steps 2 and 4.

53. A method for controlling the velocity of a motor means as defined in claim 52, wherein if the value of BL is equal to zero, then ascertaining if a new movement of the motor means is desired and if so, receiving information regarding such desired motor movement (a new value for BL).

54. A method for controlling the velocity of a motor means as defined in claim 53, wherein the maximum change in velocity (i.e., K) varies for each determination of NX and VX for each of the plurality of time intervals for which there is acceleration or deceleration of the motor means.

55. A method for controlling the velocity of a motor means as defined in claim 54, wherein the maximum change in velocity (i.e., K) is reevaluated each time the pulse velocity (VX) is changed wherein for acceleration of the motor means, the new value of K is equal to the previous value of K minus a constant and wherein for deceleration of the motor means the new value of K is equal to the previous value of K plus a constant.

56. A method for controlling the velocity of a motor means as defined in claim 53, wherein the value of K is a function of the number of time intervals for which there has been acceleration of the motor means (i.e. variable NC).

57. A method for controlling the velocity of a motor means as defined in claim 56, wherein the function of variable NC is negative in sign so that the value of K during time intervals for which there is acceleration is decreased for each such time interval in order to accommodate for any decrease in the acceleration torque of the motor means as the velocity of the motor means increases.

58. A method for controlling the velocity of a motor means that translates each received pulse into an incremental movement, comprising the steps of:
(1) receiving input information regarding:
   (a) a whole number (BL) representing the desired amount of movement of the motor means in terms of the whole number of pulses to be transferred to the motor means, and
   (b) at least one value representing the maximum change in velocity (i.e., acceleration or deceleration) that the motor means is capable of responding to while translating every received pulse into an incremental motor means movement, this change in velocity called K;
(2) initializing to zero the number of pulses necessary to decelerate the motor means (BN) and the number of time intervals for which there has been acceleration of the motor means (NC);
(3) generating a plurality of time intervals, each interval having a duration so that at least one pulse, and generally a plurality of pulses, are transferred to the motor means during each interval;
(4) if the value of BL is greater than zero, determining the whole number of pulses (NX) and the pulse rate (VX) of these pulses to transfer to the motor means during each time interval by performing the following substeps:
   (a) determining if the number of pulses remaining to be transferred to the motor means (i.e., BL) minus the number of pulses necessary to decelerate the motor means (BN) is greater than at least a constant (where the constant has a value equal or greater than one) times the number of time intervals for which there has been acceleration of the motor means (NC), and if so, increasing the pulse velocity (VX) by the current value of K, increasing the value of BN by the value of NC and then increasing the value of NC by one, decreasing the value of BL by the new value of NC, and setting the number of pulses (NX) for the next interval to the value of NC so that the motor means is accelerated by the new value of NX at a pulse velocity of VX,
   (b) if the value of BL minus BN is not greater than said constant times NC but is greater than NC, decreasing the value of BL by the last value of NC, setting the number of pulses (NX) for the next interval to the value of NC and maintaining the last determined pulse velocity VX, and
   (c) if the value of BL minus BN is less than NC, decreasing the value of NC by one and then decreasing the value of BN by the new value of NC, decreasing the pulse velocity (VX) by the current value of K, decreasing the value of BL by the value of NC and setting the number of pulses (NX) for the next interval to the value of NC so that the motor means is decelerated by the new value of NX; and (5) transferring to the motor means for each time interval the determined whole number of pulses equal to the value of NX at a pulse rate of VX;

whereby the motor means is accelerated during one or more time intervals, wherein the change in pulse velocity during each time interval is within the maximum change in velocity value of the motor means, and wherein said acceleration continues until the amount of counts remaining to be sent to the motor means minus the number of pulses necessary to decelerate the motor means is less than said constant times the number of time intervals during which acceleration has taken place, and wherein the pulse rate is maintained for zero or more time intervals if for each such time interval the amount of counts remaining to be sent to the motor means minus the number of pulses necessary to decelerate the motor means is greater than the number of time intervals during which acceleration has taken place; and wherein the motor means is decelerated during one or more time intervals if for each such time interval the number of counts remaining to be sent to the motor means, less the number of pulses necessary to decelerate the motor means, is less than the number of time intervals during which acceleration has taken place, wherein said deceleration is within the maximum change in velocity of the motor means, and wherein this deceleration of the motor means continues until no further pulses are present for transfer to the motor means.

59. A method for controlling the velocity of a motor means as defined in claim 58, wherein the step of receiving input information further receives information for a number (VM) representing the maximum velocity that the motor means can respond to while being capable for translating every received pulse into an incremental motor movement, and further, wherein at Step 4(a) wherein the pulse velocity (VX) is increased by the current value of K, if said value is greater than VM, then maintaining the pulse velocity (VX) at its previous value and further maintaining the previous value of BN and NC, rather than increasing the value of BN by the value of NC and incrementing by one the value of NC; whereby the pulse velocity is increased if BL minus BN is greater than the multiple times NC provided that the determined pulse velocity does not exceed the maximum velocity that the motor means is capable for responding to while translating every received pulse into an incremental motor movement.

60. A method for controlling the velocity of a motor means as defined in claim 58, wherein the transferring to the motor means for each time interval the number of pulses equal to the value of NX at a pulse rate of VX is performed by the following substep:
   (a) transferring to a rate multiplier a number associated with the pulse velocity VX and transferring to a downcounter the number of pulses equal to NX,
   (b) generating a pulse out signal from the rate multiplier when the number of pulses received from a clock signal, times the value of VX, exceeds a maximum count of the rate multiplier and transferring this pulse out signal to a digital motor control for generating a pulse to the motor means, as well as transferring this pulse out signal to the down counter so as to decrement by one the value of the count within the down counter as originally established by NX, and
   (c) continuing Step b until the value in the downcounter is equal to zero at which time further output signals from the rate multiplier are terminated for that time interval.

61. A method for controlling the velocity of a motor means as defined in claim 60, wherein a computer performs at least Steps 2 and 4.

62. A method for controlling the velocity of a motor means as defined in claim 58, wherein a single value represents the maximum change in velocity that the motor means is capable of responding to while translating every received pulse into an incremental motor means movement.

63. A method for controlling the velocity of a motor means as defined in claim 62, wherein the step of receiving input information further receives information for a number (VM) representing the maximum velocity that the motor means can respond to while being capable for translating every received pulse into an incremental motor movement, and further, wherein at Step 4(a) wherein the pulse velocity (VX) is increased by the current value of K, if said value is greater than VM, then maintaining the pulse velocity (VX) at its previous value and further maintaining the previous value of BN and NC, rather than increasing the value of BN by the value of NC and incrementing by one the value of NC; whereby the pulse velocity is increased if BL minus BN is greater than the multiple times NC provided that the determined pulse velocity does not exceed the maximum velocity that the motor means is capable for responding to while translating every received pulse into an incremental motor movement.

64. A method for controlling the velocity of a motor means as defined in claim 63, wherein the constant times the number of time intervals for which there has been acceleration of the motor means (NC) is equal to the value 2.

65. A method for controlling the velocity of a motor means as defined in claim 64, further comprising the step of receiving input information regarding a number ($V_{INIT}$) representing the initial motor means velocity and wherein the initializing of a plurality of variables used in the determination of the number of pulses generated during any given time interval, further comprises initializing the value VX to the value of $V_{INIT}$ and transferring said pulse to the motor means during a first-time interval and further, wherein the value of BL is decreased by one; whereby an initial velocity equal to the value of $V_{INIT}$ is obtained by presenting a pulse to the motor means during a first-time interval.

66. A method for controlling the velocity of a motor means as defined in claim 65, wherein the constant times the number of time intervals for which there has been acceleration of the motor means (NC) is equal to the value 2.

67. A method for controlling the velocity of a motor means that translates each received pulse essentially simultaneously into an incremental movement, comprising the steps of:
  (1) receiving input information regarding the following parameters:
    (a) a whole number (BL) representing the desired amount of movement of the motor means in terms of the whole number of pulses to be transferred to the motor means,
    (b) a number (VM) representing the maximum velocity in pulses per second that the motor means can respond to while being capable of translating every received pulse into an incremental motor movement,
    (c) a number (K) representing the maximum change in velocity (i.e., acceleration) that the motor means is capable of responding to while translating every received pulse into an incremental motor movement, and
    (d) a number ($V_{INIT}$) representing the initial motor means velocity in pulses per second;
  (2) generating a plurality of time intervals wherein for each time interval at least one pulse, and generally a plurality of pulses, are to be transferred to the motor means;
  (3) determining the whole number of pulses to transfer to the motor means during each time interval, wherein the pulses generated in any given time interval are generated at a substantially uniform rate, and wherein the change in rate of the pulses in adjacent time intervals does not exceed the acceleration limit (K) associated with the motor means, wherein the pulse rate is determined by the following substeps:
    (a) initializing a plurality of variables used in the determination of the number of pulses to generate during any given time interval including the intialization of a variable (BN) representing an integer corresponding to the minimum number of pulses required to decelerate the motor means to substantially zero velocity, a variable (NC) representing the number of time intervals, less one, during which acceleration of the motor means has occurred, and further wherein the initialization causes a variable (NX), representing the number of pulses to be generated per time interval, to be set to the value one, and wherein a variable (VX) representing the velocity in pulses per second per time interval is set to the value of $V_{INIT}$, and transferring said pulse to the motor means during a time interval proportional to the value of $V_{INIT}$, and further wherein the variable (BL) representing the number of pulses remaining to be transferred to the motor means is decreased by one;
    (b) determining if the variable (BL) equals zero, and if it is equal to zero determining if further movement of the motor means is desired, and if so receiving information for such further movement and returning to substep a of this step, and if not, stopping, and
    (c) if the value of BL is greater than zero, determining if the number of pulses remaining to be transferred to the motor means (variable BL) minus the number of counts necessary to decelerate the motor (variable BN) is greater than two times the number of time intervals for which there has been acceleration, less one, (i.e., equal to 2 times NC) and if the result is greater than zero, accelerating the motor means by increasing the value of the variable (VX) by an amount equal to the acceleration constant K provided that the value of VX does not exceed the maximum velocity value (VM) that the motor means can accurately respond to, and if the value of VM would be exceeded by increasing the value of VX, then maintaining the previous value of VX, BN and NC while decreasing the value of BL by the value of NC, and if the value of VM is not exceeded by the value of VX then increasing the value of variable (BN) by the value of variable (NC) and then increasing the value of variable (NC) by one and decreasing the value of BL by the new value of NC, and if the value of BL minus BN is not greater than two times NC but is greater than NC, then maintaining the values of NC and VX while decreasing the value of BL by the value of NC, and if the value of BL minus BN is less than NC, then

*decreasing the value of NC by one and then decreasing the value of BN by the value of NC, decreasing the value of VX by the acceleration constant K, and decreasing value of BL by the value of NC; and*

*(4) transferring to the motor means for each time interval the whole number of pulses equal to the value of NX at a pulse rate equal to the value of VX;*

*whereby the motor means is accelerated during each of a plurality of time intervals, wherein the change in pulse velocity during each time interval is within the acceleration limit of the motor means, and wherein said aceleration continues until the maximum velocity of the motor would be exceeded or (inclusive sense) until the amount of counts remaining to be sent to the motor means is less than approximately two times the number of time intervals during which acceleration has taken place, and wherein the number of pulses during consecutive time intervals remains constant if the number of pulses remaining to be transferred minus the minimum number of pulses required for deceleration is less than two times the number of intervals for which acceleration has occurred but greater than said number of intervals, and further wherein deceleration occurs whenever the number of pulses remaining reduced by the value of the minimum number of pulses necessary for deceleration is equal to or less than the number of intervals for which acceleration has occurred.*

68. A method for controlling the velocity of a motor means as defined in claim 67, wherein the transferring to the motor means for each time interval the number of pulses equal to the value of NX at a pulse rate of VX is performed by the following substep:

(a) *transferring to a rate multiplier a number associated with the pulse velocity VX and transferring to a downcounter the number of pulses equal to NX,*

(b) *generating a pulse out signal from the rate multiplier when the number of pulses received from a clock signal, times the value of VX, exceeds a maximum count of the rate multiplier and transferring this pulse out signal to a digital motor control for generating a pulse to the motor means, as well as transferring this pulse out signal to the down counter so as to increment by one the value of the count within the down counter as originally established by NX, and*

(c) *continuing Step b until the value in the downcounter is equal to zero at which time further output signals from the rate multiplier are terminated for that time interval.*

69. A method for controlling the velocity of a motor means as defined in claim 68, wherein a computer performs Steps 2 and 4.

70. A method for controlling the velocity of a motor means that translates each received pulse into an incremental movement, comprising the steps of:

(1) *receiving input information regarding:*

(a) *a whole number (BL) representing the desired amount of movement of the motor means in terms of the number of pulses to be transferred to the motor means, and*

(b) *at least one value representing the maximum change in velocity (i.e., acceleration or deceleration) that the motor means is capable of responding to while translating every received pulse into an incremental motor means movement, this change in velocity called K;*

(2) *initializing to zero the number of pulses necessary to decelerate the motor means (BN) and the number of time intervals for which there has been acceleration of the motor means (NC);*

(3) *generating a plurality of equal duration time intervals, each interval having a duration so that at least one pulse, and generally a plurality of pulses, are transferred to the motor means during each interval;*

(4) *if the value of BL is greater than zero, determining the whole number of pulses (NX) to transfer to the motor means during each time interval by performing the following substeps:*

(a) *determining if the number of pulses remaining to be transferred to the motor means (i.e., BL) minus the number of pulses necessary to decelerate the motor means (BN) is greater than at least a constant (where the constant has a value equal or greater than one) times the number of time intervals for which there has been acceleration of the motor means (NC), and if so, increasing the value of BN by the value of NC and then increasing the value of NC by one, decreasing the value of BL by the new value of NC, and setting the number of pulses (NX) for the next interval to the value of NC so that the motor means is accelerated by the new value of NX at a rate equal to the then maximum change in velocity value (K),*

(b) *if the value of BL minus BN is not greater than said constant times NC but is greater than NC, decreasing the value of BL by the last value of NC and setting the number of pulses (NX) for the next interval to the value of NC, and*

(c) *if the value of BL minus BN is less than NC, decreasing the value of NC by one and then decreasing the value of BN by the new value of NC, decreasing the value of BL by the value of NC and setting the number of pulses (NX) for the next interval to the value of NC so that the motor means is decelerated by the new value of NX at a rate equal to the then maximum change in velocity value (K); and*

(5) *transferring to the motor means for each time interval the determined whole number of pulses equal to the value of NX, said transfer of pulses at an approximately even rate;*

*whereby the motor means is accelerated during one or more equal duration time intervals, wherein the change in pulse velocity during each time interval is within the maximum change in velocity value of the motor means, and wherein said acceleration continues until the amount of counts remaining to be sent to the motor means minus the number of pulses necessary to decelerate the motor means is less than said constant times the number of time intervals during which acceleration has taken place; wherein the pulse rate is maintained for zero or more equal duration time intervals if for each such time interval the amount of counts remaining to be sent to the motor means minus the number of pulses necessary to decelerate the motor means is greater than the number of time intervals during which acceleration has taken place but less than said constant times the number of time intervals during which acceleration has taken place; and wherein the motor means is decelerated during one or more equal duration time intervals if for each such time interval the number of counts remaining to be sent to the motor means, less the number of pulses necessary to decelerate the motor means, is less than the number of time intervals during which acceleration has taken place, wherein said deceleration is within the change in velocity of the motor means, and wherein this*

*deceleration of the motor means continues until no further pulses are present for transfer to the motor means.*

*71. A method for controlling the velocity of a motor means as defined in claim 70, wherein a single value represents the maximum change in velocity that the motor means is capable of responding to while translating every received pulse into an incremental motor means movement.*

*72. A method for controlling the velocity of a motor means as defined in claim 71, wherein the step of receiving input information further receives information for a number (VM) representing the maximum velocity that the motor means can respond to while being capable of translating every received pulse into an incremental motor movement, and further wherein at Step 4(a) the number of pulses NX is increased only if the determined velocity VX (i.e., NX divided by the duration of the time interval) is less than VM, and otherwise maintaining the previous values for NX, BN and NC.*

*73. A method for controlling the velocity of a motor means as defined in claim 72, wherein the constant times the number of time intervals for which there has been acceleration of the motor means (NC) is equal to the value 2.*

*74. A method for controlling the velocity of a motor means as defined in claim 73, wherein if the value of BL is equal to zero, then ascertaining if a new movement of the motor means is desired and if so, receiving information regarding such desired motor movement (a new value for BL).*

*75. A method for controlling the velocity of a motor means as defined in claim 73, wherein the transferring to the motor means for each time interval the number of pulses equal to the value of NX at a determined pulse rate of VX is performed by the following substep;*

*(a) transferring to a rate multiplier a number associated with the pulse velocity VX and transferring to a down counter the number of pulses equal to NX,*

*(b) generating a pulse out signal from the rate multiplier when the number of pulses received from a clock signal, times the value of VX, exceeds a maximum count of the rate multiplier and transferring this pulse out signal to a digital motor control for generating a pulse to the motor means, as well as transferring this pulse out signal to the down counter so as to decrement by one the value of the count within the down counter as originally established by NX, and*

*(c) continuing Step b until the value in the downcounter is equal to zero at which time further output signals from the rate multiplier are terminated for that time interval.*

*76. A method for controlling the velocity of a motor means as defined in claim 75, wherein a computer performs at least Steps 2 and 4.*

*77. A method for controlling the velocity of a motor means as defined in claim 76, wherein the transferring to the rate multiplier a number associated with VX and transferring to the down counter a number equal to NX is obtained from a buffer storage.*

*78. A method for controlling the velocity of a motor means as defined in claim 70, wherein the maximum change in velocity (i.e., K) varies for each determination of NX for each of the plurality of time intervals for which there is acceleration or deceleration of the motor means.*

*79. A method for controlling the velocity of a motor means as defined in claim 78, wherein the maximum change in velocity (i.e., K) is reevaluated each time the number of pulses per time interval is changed, wherein for acceleration of the motor means, the new value of K is equal to the previous value of K minus a constant and wherein for deceleration of the motor means the new value of K is equal to the previous value of K plus a constant.*

*80. A method for controlling the velocity of a motor means as defined in claim 70, wherein the value of K is a function of the number of time intervals for which there has been acceleration of the motor means (i.e., variable NC).*

*81. A method for controlling the velocity of a motor means as defined in claim 80, wherein the function of variable NC is negative in sign so that the value of K during time intervals for which there is acceleration is decreased for each such time interval in order to accommodate for any decrease in the acceleration torque of the motor means as the velocity of the motor means increases.*

*82. A method for controlling the velocity of a motor means as defined in claim 70, wherein the step of receiving input information further receives information for a number (VM) representing the maximum velocity that the motor means can respond to while being capable of translating every received pulse into an incremental motor movement, and further wherein at Step 4(a) the number of pulses NX is increased only if the determined velocity (i.e., NX divided by the duration of the time interval) is less than VM, and otherwise maintaining the previous values for NX, BN and NC.*

*83. A method for controlling the velocity of a motor means as defined in claim 82, wherein the constant times the number of time intervals for which there has been acceleration of the motor means (NC) is equal to the value 2.*

*84. A method for controlling the velocity of a motor means as defined in claim 83, wherein the maximum change in velocity (i.e., K) varies for each determination of NX for each of the plurality of time intervals for which there is acceleration or deceleration of the motor means.*

*85. A method for controlling the velocity of a motor means as defined in claim 83, wherein the value of K is a function of the number of time intervals for which there has been acceleration of the motor means (i.e., variable NC).*

*86. A method for controlling the velocity of a motor means that translates each received pulse into an incremental movement, comprising the steps of:*

*(1) receiving input information regarding:*
   *(a) a whole number (BL) representing the desired amount of movement of the motor means in terms of the number of pulses to be transferred to the motor means, and*
   *(b) at least one value representing the maximum change in velocity (i.e., acceleration or deceleration) that the motor means is capable of responding to while translating every received pulse into an incremental motor means movement, this change in velocity called K;*

*(2) initializing to zero the number of pulses necessary to decelerate the motor means (BN) and the number of time intervals for which there has been acceleration of the motor means (NC);*

*(3) generating a plurality of equal duration time intervals each interval having a duration so that at least one pulse, and generally a plurality of pulses, are transferred to the motor means during each interval;*

*(4) if the value of BL is greater than zero, determining the whole number of pulses (NX) to transfer to the motor means during each time interval by performing the following substeps:*
   *(a) determining if the number of pulses remaining to be transferred to the motor means (i.e., BL) minus* the number of pulses necessary to decelerate the motor means (BN) is greater than at least a constant (where the constant has a value equal or greater than one) times the number of time intervals for which there has been acceleration of the motor means (NC), and if so, increasing the value of BN by the value of NC and then increasing the value of NC by one, decreasing the value of BL by the new value of NC, and setting the number of pulses (NX) for the next interval to the value of NC so that the motor means is accelerated by the new value of NX at a rate equal to the then maximum change in velocity value (K), (b) if the value of BL minus BN is not greater than said constant times NC but is greater than NC, setting the number of pulses (NX) for the next interval to the value of BL minus BN, adjusting the time interval so that its duration is proportional to the present value of NX as compared to the immediately previous value of NX and then setting the value of BL to the value of BN, and (c) if the value of BL minus BN is less than NC, decreasing the value of NC by one and then decreasing the value of BN by the new value of NC, decreasing the value of BL by the value of NC and setting the number of pulses (NX) for the next interval to the value of NC so that the motor means is decelerated by the new value of NX at a rate equal to the then maximum change in velocity (K); and (5) transferring to the motor means for each time interval the determined whole number of pulses equal to the value of NX, said transfer of pulses at an approximately even rate;

whereby the motor means is accelerated during one or more equal duration time intervals, wherein the change in pulse velocity during each time interval is within the maximum change in velocity value of the motor means, and wherein said acceleration continues until the amount of counts remaining to be sent to the motor means minus the number of pulses necessary to decelerate the motor means is less than said constant times the number of time intervals during which acceleration has taken place; wherein the pulse rate is maintained for an adjustable duration time interval until a number of pulses equal to the then difference in value between BL and BN is transferred to the motor means; and wherein the motor means is decelerated during one or more equal duration time intervals if for each such time interval the number of counts remaining to be sent to the motor means, less the number of pulses necessary to decelerate the motor means, is less than the number of time intervals during which acceleration has taken place, wherein said deceleration is within the maximum change in velocity of the motor means, and wherein this deceleration of the motor means continues until no further pulses are present for transfer to the motor means.

87. A method for controlling the velocity of a motor means as defined in claim 86, wherein a single value represents the maximum change in velocity that the motor means is capable of responding to while translating every received pulse into an incremental motor means movement.

88. A method for controlling the velocity of a motor means as defined in claim 87, wherein the step of receiving input information further receives information for a number (VM) representing the maximum velocity that the motor means can respond to while being capable of translating every received pulse into an incremental motor movement, and further wherein at Step 4(a) the number of pulses NX is increased only if the determined velocity VX (i.e., NX divided by the duration of the time interval) is less than VM, and otherwise maintaining the previous values for NX, BN and NC.

89. A method for controlling the velocity of a motor means as defined in claim 88, wherein the value of K is a function of the number of time intervals for which there has been acceleration of the motor means (i.e., variable NC).

90. A method for controlling the velocity of a motor means as defined in claim 89, wherein the function of variable NC is negative in sign so that the value of K during time intervals for which there is acceleration is decreased for each such time interval in order to accommodate for any decrease in the acceleration torque of the motor means as the velocity of the motor means increases.

91. A method for controlling the velocity of a motor means as defined in claim 88, wherein the constant times the number of time intervals for which there has been acceleration of the motor means (NC) is equal to the value 2.

92. A method for controlling the velocity of a motor means as defined in claim 91, wherein if the value of BL is equal to zero, then ascertaining if a new movement of the motor means is desired and if so, receiving information regarding such desired motor movement (a new value for BL).

93. A method for controlling the velocity of a motor means as defined in claim 91, wherein the transferring to the motor means for each time interval the number of pulses equal to the value of NX at a predetermined pulse rate of VX is performed by the following substep:

(a) transferring to a rate multiplier a number associated with the pulse velocity VX and transferring to a down counter the number of pulses equal to NX, (b) generating a pulse out signal from the rate multiplier when the number of pulses received from a clock signal, times the value of VX, exceeds a maximum count of the rate multiplier and transferring this pulse out signal to a digital motor control for generating a pulse to the motor means, as well as transferring this pulse out signal to the down counter so as to decrement by one the value of the count within the down counter as originally established by NX, and (c) continuing Step b until the value in the downcounter is equal to zero at which time further output signals from the rate multiplier are terminated for that time interval.

94. A method for controlling the velocity of a motor means as defined in claim 93, wherein a computer performs at least Steps 2 and 4.

95. A method for controlling the velocity of a motor means as defined in claim 94, wherein the transferring to the rate multiplier a number associated with VX and transferring to the down counter a number equal to NX is obtained from a buffer storage.

96. A method for controlling the velocity of a motor means as defined in claim 86, wherein the maximum change in velocity (i.e., K) varies for each determination of NX for each of the plurality of time intervals for which there is acceleration or deceleration of the motor means.

97. A method for controlling the velocity of a motor means as defined in claim 96, wherein the maximum change in velocity (i.e., K) is reevaluated each time the number of pulses per time interval (NX) is changed, wherein for acceleration of the motor means, the new value of K is equal to the previous value of K minus a constant and wherein for deceleration of the motor means the new value of K is equal to the previous value of K plus a constant.

98. A method for controlling the velocity of a motor means as defined in claim 86, wherein the step of receiving input information further receives information for a number (VM) representing the maximum velocity that the motor means can respond to while being capable of translating every received pulse into an incremental motor movement, and further wherein at Step 4(a) the number of pulses NX is increased only if the determined velocity VX (i.e., NX divided by the duration of the time interval) is less than VM, and otherwise maintaining the previous values of NX, BN and NC.

99. A method for controlling the velocity of a motor means as defined in claim 98, wherein the constant times the number of time intervals for which there has been acceleration of the motor means (NC) is equal to the value 2.

100. A method for controlling the velocity of a motor means as defined in claim 99, wherein the maximum change in velocity (i.e., K) varies for each determination of NX for each of the plurality of time intervals for which there is acceleration or deceleration of the motor means.

101. A method for controlling the velocity of a motor means as defined in claim 99, wherein the value of K is a function of the number of time intervals for which there has been acceleration of the motor means (i.e., variable NC).

102. A system for controlling the velocity of a motor means that translates each received pulse into an incremental movement, comprising:

(1) means for receiving input information regarding:

(a) a whole number (BL) representing the desired amount of movement of the motor means in terms of the whole number of pulses to be transferred to the motor means, and (b) at least one value representing the maximum change in velocity (i.e., acceleration or deceleration) that the motor means is capable of responding to while translating every received pulse into an incremental motor means movement, this change in velocity called K;

(2) means for initializing to zero the number of pulses necessary to decelerate the motor means (BN) and the number of time intervals for which there has been acceleration of the motor means (NC);

(3) means for generating a plurality of time intervals, each interval having a duration so that at least one pulse, and generally a plurality of pulses, are transferred to the motor means during each interval;

(4) means for determining if the value of BL is greater than zero, and if so, means for determining the whole number of pulses (NX) and the pulse rate (VX) of these pulses to transfer to the motor means during each time interval wherein the means for determining NX and VX comprises:

(a) means for determining if the number of pulses remaining to be transferred to the motor means (i.e., BL) minus the number of pulses necessary to decelerate the motor means (BN) is greater than at least a constant (where the constant has a value equal or greater than one) times the number of time intervals for which there has been acceleration of the motor means (NC), and if so, means for increasing the pulse velocity (VX) by the current value of K, means for increasing the value of BN by the value of NC and then increasing the value of NC by one, decreasing the value of BL by the new value of NC, and setting the number of pulses (NX) for the next interval to the value of NC so that the motor means is accelerated by the new value of NX at a pulse velocity of VX, (b) means for determining if the value of BL minus BN is not greater than said constant time NC but is greater than NC, and if so, means for setting the number of pulses (NX) for the next interval to the value of BL minus BN, maintaining the last determined pulse velocity VX, and means for then setting the value of BL to the value of BN, and (c) means for determining if the value of BL minus BN is less than NC, and if so, means for decreasing the value of NC by one and then decreasing the value of BN by the new value of NC, decreasing the pulse velocity (VX) by the current value of K, decreasing the value of BL by the value of NC and means for setting the number of pulses (NX) for the next interval to the value of NC so that the motor means is decelerated by the new value of NX; and (5) means for transferring to the motor means for each time interval the determined whole number of pulses equal to the value of NX at a pulse rate of VX;

whereby the motor means is accelerated during one or more time intervals, wherein the change in pulse velocity during each time interval is within the maximum change in velocity value of the motor means, and wherein said acceleration continues until the amount of counts remaining to be sent to the motor means minus the number of pulses necessary to decelerate the motor means is less than said constant times the number of time intervals during which acceleration has taken place, and wherein the pulse rate is maintained until a number of pulses equal to the then difference in value between BL and BN is transferred to the motor means and wherein the motor means is then decelerated until no further pulses are present for transfer to the motor means.

103. A system for controlling the velocity of a motor means as defined in claim 102, wherein a single value represents the maximum change in velocity that the motor means is capable of responding to while translating every received pulse into an incremental motor means movement.

104. A system for controlling the velocity of a motor means as defined in claim 103, wherein the means for receiving input information further includes means for receiving information for a number (VM) representing the maximum velocity that the motor means can respond to while being capable for translating every received pulse into an incremental motor movement, and further, wherein the means for increasing the pulse velocity (VX) comprises means for comparing the determined pulse velocity to the value of VM, and if said value is greater than VM, then means for maintaining the pulse velocity (VX) at its previous value and further for maintaining the previous value of BN and NC, rather than increasing the value of BN by the value of NC and incrementing by one the value of NC; whereby the pulse velocity is increased if BL minus BN is greater than the multiple times NC provided that the determined pulse velocity does not exceed the maximum velocity that the motor means is capable for responding to while translating every received pulse into an incremental motor movement.

105. A system for controlling the velocity of a motor means as defined in claim 104, wherein the constant times the number of time intervals for which there has been acceleration of the motor means (NC) is equal to the value 2.

106. A system for controlling the velocity of the motor means as defined in claim 105, wherein the means for transferring to the motor means for each time interval the number of pulses equal to the value NX at a pulse rate of VX comprises:
  (a) a clock for generating periodic clock pulses at a frequency substantially greater than the highest value of VX;
  (b) a down counter having means for receiving the value of NX, the down counter having an input for receipt of pulses for transfer to the motor means so as to decrement by one the value of NX for each such received pulse, the down counter further having means for generating an output signal when the value of NX is equal to zero;
  (c) buffer means for receipt of computed values of VX and NX, said buffer means being disabled by receipt of the NX equal zero output from the down counter;
  (d) a rate multiplier connected to the VX transfer buffer and to the clock output for generating output pulses at a rate equal to the pulse velocity VX, wherein the output pulses continue until NX pulses have been generated through disablement of the pulse out signal by the down counter; and
  (e) a digital motor control connected to the output of the rate multiplier for generating pulses to the motor means having the same frequency and number as that received from the rate multiplier.

107. A system for controlling the velocity of a motor means as defined in claim 106, wherein a programmed digital computer comprises the means for initializing BN and NC and comprises the means for determining NX and VX.

108. A system for controlling the velocity of a motor means as defined in claim 107, further comprising means for receiving input information regarding a number ($V_{INIT}$) representing the initial motor means velocity and wherein the means for initializing BN and NC further comprises means for initializing the value of VX to the value of $V_{INIT}$ and transferring a pulse to the motor means during a first-time interval having a duration so that a first pulse has a pulse velocity of $V_{INIT}$, and further comprising means for decreasing the value of BL by one; whereby an initial velocity equal to the value of $V_{INIT}$ is obtained by presenting a pulse to the motor means during a first-time interval.

109. A system for controlling the velocity of a motor means as defined in claim 108, further comprising means, such that when the value of BL equals zero; said means ascertain if a new movement of the motor means is desired and if so, receiving information regarding such desired motor movement (a new value for BL).

110. A system for controlling the velocity of a motor means as defined in claim 102, further comprises means for varying the maximum change in velocity (i.e., K) for each of the pluraltiy of time intervals for which there is acceleration or deceleration of the motor means.

111. A system for controlling the velocity of a motor means as defined in claim 110, said means for varying the maximum change in velocity (i.e., K) includes means for reevaluating K each time the pulse velocity (VX) is changed, wherein for acceleration of the motor means, the new value of K is equal to the previous value of K minus a constant and wherein for deceleration of the motor means the new value of K is equal to the previous value of K plus a constant.

112. A system for controlling the velocity of a motor means as defined in claim 102, further comprising means for varying the value of K as a function of the number of time intervals for which there has been acceleration of the motor means (i.e., variable NC).

113. A system for controlling the velocity of a motor means as defined in claim 112, wherein the function of variable NC is negative in sign so that the value of K during time intervals for which there is acceleration is decreased for each such time interval in order to accommodate for any decrease in the acceleration torque of the motor means as the velocity of the motor means increases.

114. A system for controlling the velocity of a motor means that translates each received pulse into an incremental movement, comprising:
  (1) means for receiving input information regarding:
    (a) a whole number (BL) representing the desired amount of movement of the motor means in terms of the whole number of pulses to be transferred to the motor means, and
    (b) at least one value representing the maximum change in velocity (i.e., acceleration or deceleration) that the motor means is capable of responding to while translating every received pulse into an incremental motor means movement, this change in velocity called K;
  (2) means for initializing to zero the number of pulses necessary to decelerate the motor means (BN) and the number of time intervals for which there has been acceleration of the motor means (NC);
  (3) means for generating a plurality of time intervals, each interval having a duration so that at least one pulse, and generally a plurality of pulses, are transferred to the motor means during each interval;
  (4) means for determining if the value of BL is greater than zero, and if so, means for determining the whole number of pulses (NX) and the pulse rate (VX) of these pulses to transfer to the motor means during each time interval wherein the means for determining NX and NX comprises:
    (a) means for determining if the number of pulses remaining to be transferred to the motor means (i.e., BL) minus the number of pulses necessary to decelerate the motor means (BN) is greater than at least a constant (where the constant has a value equal or greater than one) times the number of time intervals for which there has been acceleration of the motor means (NC), and if so, means for increasing the pulse velocity (VX) by the current value of K, means for increasing the value of BN by the value of NC and then increasing the value of NC by one, decreasing the value of BL by the new value of NC, and setting the number of pulses (NX) for the next interval to the value of NC so that the motor means is accelerated by the new value of NX at a pulse velocity of VX,
    (b) means for determining if the value of BL minus BN is not greater than said constant times NC but is greater than NC, and if so, means for decreasing the value of BL by the last value of NC, setting the number of pulses (NX) for the next interval to the value of NC and maintaining the last determined pulse velocity VX, and
    (c) means for determining if the value of BL minus BN is less than NC, and if so, means for decreasing the value of NC by one and then decreasing the value of BN by the new value of NC, decreasing the pulse velocity (VX) by the current value of K, decreasing the value of BL by the value of NC and means for setting the number of pulses (NX) for the

*next interval to the value of NC so that the motor means is decelerated by the new value of NX; and*

(5) *means for transferring to the motor means for each time interval the determined whole number of pulses equal to the value of NX at a pulse rate of VX;*

*whereby the motor means is accelerated during one or more time intervals, wherein the change in pulse velocity during each time interval is within the maximum change in velocity value of the motor means, and wherein said acceleration continues until the amount of counts remaining to be sent to the motor means minus the number of pulses necessary to decelerate the motor means is less than said constant times the number of time intervals during which acceleration has taken place, and wherein the pulse rate is maintained for zero or more time intervals if for each such time interval the amount of counts remaining to be sent to the motor means minus the number of pulses necessary to decelerate the motor means is greater than the number of time intervals during which acceleration has taken place; wherein the motor means is then decelerated until no further pulses are present for transfer to the motor means.*

115. *A system for controlling the velocity of a motor means as defined in claim 114, wherein a single value represents the maximum change in velocity that the motor means is capable of responding to while translating every received pulse into an incremental motor means movement.*

116. *A system for controlling the velocity of a motor means as defined in claim 115, wherein the means for receiving input information further includes means for receiving information for a number (VM) representing the maximum velocity that the motor means can respond to while being capable of translating every received pulse into an incremental motor movement, and further, wherein the means for increasing the pulse velocity (VX) comprises means for comparing the determined pulse velocitiy to the value of VM, and if said value is greater than VM, then means for maintaining the pulse velocity (VX) at its previous value and further for maintaining the previous value of BN and NC, rather than increasing the value of BN by the value of NC and increasing by one the value of NC; whereby the pulse velocity is increased if BL minus BN is greater than the multiple times NC provided that the determined pulse velocity does not exceed the maximum velocity that the motor means is capable for responding to while translating every received pulse into an incremental motor movement.*

117. *A system for controlling the velocity of a motor means as defined in claim 116, wherein the constant times the number of time intervals for which there has been acceleration of the motor means (NC) is equal to the value 2.*

118. *A system for controlling the velocity of the motor means as defined in claim 117, wherein the means for transferring to the motor means for each time interval the number of pulses equal to the value NX at a pulse rate of VX comprises:*

(a) *a clock for generating periodic clock pulses at a frequency substantially greater than the highest value of VX;*

(b) *a down counter having means for receiving the value of NX, the down counter having an input for receipt of pulses for transfer to the motor means so as to decrement by one the value of NX for each such received pulse, the down counter further having means for generating an output signal when the value of NX is equal to zero;*

(c) *buffer means for receipt of computed values of VX and NX, said buffer means being disabled by receipt of the NX equal zero output from the down counter;*

(d) *a rate multiplier connected to the VX transfer buffer and to the clock output for generating output pulses at a rate equal to the pulse velocity VX, wherein the output pulses continue until NX pulses have been generated through disablement of the pulse out signal by the down counter; and*

(e) *a digital motor control connected to the output of the rate multiplier for generating pulses to the motor means having the same frequency and number as that received from the rate multiplier.*

119. *A system for controlling the velocity of a motor means as defined in claim 118, wherein a programmed digital computer comprises the means for initializing BN and NC and comprises the means for determining NX and VX.*

120. *A system for controlling the velocity of a motor means as defined in claim 119, further comprising means for receiving input information regarding a number ($V_{INIT}$) representing the initial motor means velocity and wherein the means for initializing BN and NC further comprises means for initializing the value of VX to the value of $V_{INIT}$ and transferring a pulse to the motor means during a first-time interval having a duration so that a first pulse has a pulse velocity of $V_{INIT}$; and further comprising means for decreasing the value of BL by one; whereby an initial velocity equal to the value of $V_{INIT}$ is obtained by presenting a pulse to the motor means during a first-time interval.*

121. *A system for controlling the velocity of a motor means as defined in claim 120, further comprising means, such that when the value of BL equals zero; said means ascertains if a new movement of the motor means is desired and if so, receiving information regarding such desired motor movement (a new value for BL).*

122. *A system for controlling the velocity of a motor means as defined in claim 114, further comprises means for varying the maximum change in velocity (i.e., K) for each of the plurality of time intervals for which there is acceleration or deceleration of the motor means.*

123. *A system for controlling the velocity of a motor means as defined in claim 122, said means for varying the maximum change in velocity (i.e., K) includes means for reevaluating K each time the pulse velocity (VX) is changed, wherein for acceleration of the motor means, the new value of K is equal to the previous value of K minus a constant and wherein for deceleration of the motor means the new value of K is equal to the previous value of K plus a constant.*

124. *A system for controlling the velocity of a motor means as defined in claim 114, further comprising means for varying the value of K as a function of the number of time intervals for which there has been acceleration of the motor means (i.e., variable NC).*

125. *A system for controlling the velocity of a motor means as defined in claim 124, wherein the function of variable NC is negative in sign so that the value of K during time intervals for which there is acceleration is decreased for each such time interval in order to accommodate for any decrease in the acceleration torque of the motor means as the velocity of the motor means increases.*

126. *A system for controlling the velocity of a motor means that translates each received pulse into an incremental movement, comprising:*

(1) *means for receiving input information regarding:*

(a) a whole number (BL) representing the desired amount of movement of the motor means in terms of the whole number of pulses to be transferred to the motor means, and (b) at least one value representing the maximum change in velocity (i.e., acceleration or deceleration) that the motor means is capable of responding to while translating every received pulse into an incremental motor means movement, this change in velocity called K;

(2) means for initializing to zero the number of pulses necessary to decelerte the motor means (BN) and the number of time intervals for which there has been acceleration of the motor means (NC) ;

(3) means for generating a plurality of equal duration time intervals each interval having a duration so that at least one pulse, and generally a plurality of pulses, are transferred to the motor means during each interval;

(4) means for determining if the value of BL is greater than zero, and if so, means for determining the whole number of pulses (NX) to transfer to the motor means during each time interval, wherein the means for determining NX comprises:

(a) means for determining if the number of pulses remaining to be transferred to the motor means (i.e., BL) minus the number of pulses necessary to decelerate the motor means (BN) is greater than at least a constant (where the constant has a value equal or greater than one) times the number of time intervals for which there has been acceleration of the motor means (NC), and if so, means for increasing the value of BN by the value of NC and then increasing the value of NC by one, decreasing the value of BL by the new value of NC, and setting the number of pulses (NX) for the next interval to the value of NC so that the motor means is accelerated by the new value of NX at a rate equal to the then maximum change in velocity value (K), (b) means for determining if the value of BL minus BN is not greater than said constant times NC but is greater than NC, and if so, means for decreasing the value of BL by the last value of NC and setting the number of pulses (NX) for the next interval to the value of NC, and (c) means for determining if the value of BL minus BN is less than NC, and if so, means for decreasing the value of NC by one and then decreasing the value of BN by the new value of NC, decreasing the value of BL by the value of NC and setting the number of pulses (NX) for the next interval to the value of NC so that the motor means is decelerated by the new value of NX at a rate equal to the then maximum change in velocity value (K); and (5) means for transferring to the motor means for each time interval the determined whole number of pulses equal to the value of NX;

whereby the motor means is accelerated during one or more equal duration time intervals, wherein the change in pulse velocity during each time interval is within the maximum change in velocity value of the motor means, and wherein said acceleration continues until the amount of counts remaining to be sent to the motor means minus the number of pulses necessary to decelerate the motor means is less than said constant times the number of time intervals during which acceleration has taken place; wherein the pulse rate is maintained for zero or more equal duration time intervals if for each such time interval the amount of counts remaining to be sent to the motor means minus the number of pulses necessary to decelerate the motor means is greater than the number of time intervals during which acceleration has taken place but less than said constant times the number of time intervals during which acceleration has taken place; and wherein the motor means is decelerated during one or more equal duration time intervals if for each such time interval the number of counts remaining to be sent to the motor means, minus the number of pulses necessary to decelerate the motor means, is less than the number of time intervals during which acceleration has taken place, wherein said deceleration is within the maximum change in velocity of the motor means, and wherein this deceleration of the motor means continues until no further pulses are present for transfer to the motor means.

127. A system for controlling the velocity of a motor means as defined in claim 126, wherein a single value represents the maximum change in velocity that the motor means is capable of responding to while translating every received pulse into an incremental motor means movement.

128. A system for controlling the velocity of a motor means as defined in claim 127, wherein the means for receiving input information further includes means for receiving information for a number (VM) representing the maximum velocity that the motor means can respond to while being capable of translating every received pulse into an incremental motor movement, and further, wherein the means for increasing the number of pulses NX further comprises means for comparing the determined pulse velocity (i.e., NX divided by the duration of the time interval) to the value of VM, and if said value is greater than VM, then means for maintaining the number of pulses NX at its previous value and further for maintaining the previous value of BN and NC, rather than increasing the value of BN by the value of NC and incrementing by one the value of NC; whereby the number of pulses per time interval (i.e., pulse velocity) is increase if BL minus BN is greater than the multiple times NC provided that the determined pulse velocity does not exceed the maximum velocity that the motor means is capable for responding to while translating every received pulses into an incremental motor movement.

129. A system for controlling the velocity of a motor means as defined in claim 128, wherein the constant times the number of time intervals for which there has been acceleration of the motor means (NC) is equal to the value 2.

130. A system for controlling the velocity of the motor means as defined in claim 129, wherein the means for transferring to the motor means for each time interval the number of pulses equal to the value NX comprises:

(a) a clock for generating periodic clock pulses;

(b) a down counter having means for receiving the value of NX, the down counter having an input for receipt of pulses for transfer to the motor means so as to decrement by one the value of NX for each such received pulse, the down counter further having means for generating an output signal when the value of NX is equal to zero;

(c) buffer means for receipt of computed values of NX and a pulse velocity VX equal to NX divided by the duration of the time interval, said buffer means being disabled by receipt of the NX equal zero output from the down counter;

(d) a rate multiplier counnected to the VX transfer buffer and to the clock output for generating output pulses at a rate equal to the pulse velocity VX, wherein the output pulses continue until NX pulses have been generated through disablement of the pulse out signal by the down counter; and (e) a digital motor control connected to the output of the rate multiplier for generating pulses to the motor means having the same frequency and number as that received from the rate multiplier.

131. A system for controlling the velocity of a motor means as defined in claim 130, wherein a programmed digital computer comprises the means for initializing BN and NC and comprises the means for determining NX.

132. A system for controlling the velocity of a motor means as defined in claim 131, further comprising means for receiving input information regarding a number ($V_{INIT}$) representing the initial motor means velocity and wherein the means for initializing BN and NC further comprises means for initializing the value of VX to the value of $V_{INIT}$ and transferring a pulse to the motor means during a first-time interval having a duration so that a first pulse has a pulse velocity of $V_{INIT}$, and further comprising means for decreasing the value of BL by one; whereby an initial velocity equal to the value of $V_{INIT}$ is obtained by presenting a pulse to the motor means during a first-time interval.

133. A system for controlling the velocity of a motor means as defined in claim 132, further comprising means, such that when the value of BL equals zero, said means ascertains if a new movement of the motor means is desired and if so, receiving information regarding such desired motor movement (a new value for BL).

134. A system for controlling the velocity of a motor means as defined in claim 126, further comprises means for varying the maximum change in velocity (i.e., K) for each of the plurality of time intervals for which there is acceleration or deceleration of the motor means.

135. A system for controlling the velocity of a motor means as defined in claim 134, said means for varying the maximum change in velocity (i.e., K) includes means for reevaluating K each time the number of pulses (NX) is changed, wherein for acceleration of the motor means, the new value of K is equal to the previous value of K minus a constant and wherein for deceleration of the motor means the new value of K is equal to the previous value of K plus a constant.

136. A system for controlling the velocity of a motor means as defined in claim 126, further comprising means for varying the value of K as a function of the number of time intervals for which there has been acceleration of the motor means (i.e., variable NC).

137. A system for controlling the velocity of a motor means as defined in claim 136, wherein the function of variable NC is negative in sign so that the value of K during time intervals for which there is acceleration is decreased for each such time interval in order to accommodate for any decrease in the acceleration torque of the motor means as the velocity of the motor means increases.

138. A system for controlling the velocity of a motor means that translates each received pulse into an incremental movement, comprising:

(1) means for receiving input information regarding:
   (a) a whole number (BL) representing the desired amount of movement of the motor means in terms of the whole number of pulses to be transferred to the motor means, and
   (b) at least one value representing the maximum change in velocity (i.e., acceleration or deceleration) that the motor means is capable of responding to while translating every received pulse into an incremental motor means movement, this change in velocity called K;

(2) means for initializing to zero the number of pulses necessary to decelerate the motor means (BN) and the number of time intervals for which there has been acceleration of the motor means (NC);

(3) means for generating a plurality of equal duration time intervals each interval having a duration so that at least one pulse, and generally a plurality of pulses, are transferred to the motor means during each interval;

(4) means for determining if the value of BL is greater than zero, and if so, means for determining the whole number of pulses (NX) to transfer to the motor means during each time interval by performing the following substeps:
   (a) means for determining if the number of pulses remaining to be transferred to the motor means (i.e., BL) minus the number of pulses necessary to decelerate the motor means (BN) is greater than at least a constant (where the constant has a value equal or greater than one) times the number of time intervals for which there has been acceleration of the motor means (NC), and if so, means for increasing the value of BN by the value of NC and then increasing the value of NC by one, decreasing the value of BL by the new value of NC, and setting the number of pulses (NX) for the next interval to the value of NC so that the motor means is accelerated by the new value of NX at a rate equal to the then maximum change in velocity value (K),
   (b) means for determining if the value of BL minus BN is not greater than said constant times NC but is greater than NC, and if so, means for setting the number of pulses (NX) for the next interval to the value of BL minus BN, adjusting the time interval so that its duration is proportional to the present value of NX as compared to the immediately previous value of NX and then setting the value of BL to the value of BN, and
   (c) means for determining if the value of BL minus BN is less than NC, and if so, means for decreasing the value of NC by one and then decreasing the value of NB by the new value of NC, decreasing the value of BL by the value of NC and setting the number of pulses (NX) for the next interval to the value of NC so that the motor means is decelerated by the new value of NX at a rate equal to the then maximum change in velocity value (K); and (5) means for transferring to the motor means for each time interval the determined whole number of pulses equal to the value of NX;

whereby the motor means is accelerated during one or more equal duration time intervals, wherein the change in pulse velocity during each time interval is within the maximum change in velocity value of the motor means, and wherein said acceleration continues until the amount of counts remaining to be sent to the motor means minus the number of pulses necessary to decelerate the motor means is less than said constant times the number of time intervals during which acceleration has taken place; wherein the pulse rate is maintained for zero or more equal duration time intervals if for each such time interval the amount of counts remaining to be sent to the motor means minus the number of pulses necessary to decelerate the motor means is greater than the number of time intervals during which acceleration has taken place but less than said constant times the number of time intervals during which acceleration has taken place; and wherein the motor means is decelerated during one or more equal duration time intervals if for each such time interval the number of counts remaining to be sent to the motor means, minus the number of pulses necessary to decelerate the motor means, is less than the number of time intervals during which acceleration has taken place, wherein said deceleration is within the maximum change in velocity of the motor means, and wherein this deceleration of the motor means continues until no further pulses are present for transfer to the motor means.

139. A system for controlling the velocity of a motor means as defined in claim 138, wherein a single value represents the maximum change in velocity that the motor means is capable of responding to while translating every received pulse into an incremental motor means movement.

140. A system for controlling the velocity of a motor means as defined in claim 139, wherein the means for receiving input information further includes means for receiving information for a number (VM) representing the maximum velocity that the motor means can respond to while being capable of translating every received pulse into an incremental motor movement, and further, wherein the means for increasing the number of pulses NX further comprises means for comparing the determined pulse velocity (i.e., NX divided by the duration of the time interval) to the value of VM, and if said value is greater than VM, then means for maintaining the number of pulses NX at its previous value and further for maintaining the previous value of BN and NC, rather than increasing the value of BN by the value of NC and incrementing by one the value of NC; whereby the number of pulses per time interval (i.e., pulse velocity) is increased if BL minus BN is greater than the multiple times NC provided that the determined pulse velocity does not exceed the maximum velocity that the motor means is capable for responding to while translating every received pulse into an incremental motor movement.

141. A system for controlling the velocity of a motor means as defined in claim 140, wherein the constant times the number of time intervals for which there has been acceleration of the motor means (NC) is equal to the value 2.

142. A system for controlling the velocity of the motor means as defined in claim 141, wherein the means for transferring to the motor means for each time interval the number of pulses equal to the value NX comprises:
(a) a clock for generating periodic clock pulses;
(b) a down counter having means for receiving the value of NX, the down counter having an input motor means so as to decrement by one the value of NX for each such received pulse, the down counter further having means for generating an output signal when the value of NX is equal to zero;
(c) buffer means for receipt of computed values of NX and a pulse velocity VX equal to NX divided by the duration of the time interval, said buffer means being disabled by receipt of the NX equal zero output from the down counters;
(d) a rate multiplier connected to the VX transfer buffer and to the clock output for generating output pulses at a rate equal to the pulse velocity VX, wherein the output pulses through disablement of the pulse out signal by the down counter; and
(e) a digital motor control connected to the output of the rate multiplier for generating pulses to the motor means having the same frequency and number as that received from the rate multiplier.

143. A system for controlling the velocity of a motor means as defined in claim 142, wherein a programmed digital computer comprises the means for initializing BN and NC and comprises the means for determining NX.

144. A system for controlling the velocity of a motor means as defined in claim 143, further comprising means for receiving input information regarding a means velocity and wherein the means for initializing BN and NC further comprises means for initializing the value of VX to the value of $V_{INIT}$ and transferring a pulse to the motor means during a first-time interval havng a duration so that a first pulse has a pulse velocity of $V_{INIT}$, and further comprising means for decreasing the value of BL by one; whereby an initial velocity equal to the value of $V_{INIT}$ is obtained by presenting a pulse to the motor means during a first-time interval.

145. A system for controlling the velocity of a motor means as defined in claim 144, further comprising means, such that when the value of BL equals zero, said means ascertain if a new movement of the motor means is desired and if so, receiving (a new value for BL).

146. A system for controlling the velocity of a motor means as defined in claim 138, further comprises means for varying the maximum change in velocity (i.e., K) for each of the plurality of time intervals for which there is acceleration or deceleration of the motor means.

147. A system for controlling the velocity of a motor means as defined in claim 146, said means for varying the maximum change in velocity (i.e., K) includes means for reevaluating K each time the number of pulses (NX) is changed wherein for acceleration of the motor means, the new value of K is equal to the previous value of K minus a constant and wherein for deceleration of the motor means the new value of K is equal to the previous value of K plus a constant.

148. A system for controlling the velocity of a motor means as defined in claim 138, further comprising means for varying the value of K as a function of the number of time intervals for which there has been acceleration of the motor means (i.e., variable NC).

149. A system for controlling the velocity of a motor means as defined in claim 148, wherein the function of variable NC is negative in sign so that the value of K during time intervals for which there is acceleration is decreased for each such time interval in order to accommodate for any decrease in the acceleration torque of the motor means as the velocity of the motor means increases.

150. A method for controlling the velocity of a motor means that translates each received pulse essentially simultaneously into an incremental movement, wherein the motor means is to be moved some desired number of incremental movements, comprising the steps of determining the change of velocity that the motor means is capable of responding to while translating every pulse into a motor movement, determining for each of a plurality of consecutive time intervals the whole number of the received pulses with there normally being a plurality of pulses in an interval, limiting the difference in the number of the received pulses between adjacent time intervals to produce no more than the determined change of velocity with the difference being a whole number of pulses, wherein the determining and limiting the whole number of received pulses is based upon the number of pulses remaining to be transferred to the motor means, the number of time intervals for which there has been acceleration of the motor means, and the determined change of velocity that the motor means is capable of responding to while translating every received pulse into a motor movement, and supplying the determined number of pulses at an approximately even rate during each time interval.

151. The invention as defined in claim 150 in which the step of determining includes the step of changing the number of pulses between at least some adjacent time intervals.

152. The invention as defined in claim 150 in which the step of determining includes the step of changing the rate of pulses between at least some adjacent time intervals.

153. The invention as defined in claim 152 in which the step of changing the rate includes the step of making the change equal to the determined change of velocity to thereby have the change equal the motor's capability to respond.

154. The invention as defined in claim 150 in which there is the step of limiting the maximum velocity and in which the step of determining for each time interval includes the step of limiting the number of the pulses in a time interval to no more than that which would produce the maximum velocity.

155. The invention as defined in claim 150 in which the step of determining includes the step of making the minimum duration of any time interval to be no less than the time required to have the motor achieve a velocity equal to the rate of the pulses at the end of the time interval.

156. The invention as defined in claim 150 in which the step of determining includes the step of setting the rate of the pulses for each time interval.

157. The invention as defined in claim 150 in which each time interval having the same number of pulses has the same distribution of the pulses over the time interval.

158. The invention as defined in claim 150 wherein the determining and limiting the whole number of received pulses is further defined by increasing the number of received pulses by one for each time interval where the number of pulses remaining to be transferred to the motor means less the number of pulses necessary to decelerate the motor means to zero velocity is greater than a multiple times the number of time intervals for which there has been acceleration of the motor means, wherein the determining and limiting the whole number of received pulses limits the number of received pulses to the immediately previous time interval value of said received pulses if the number of pulses remaining to be transferred to the motor means less the number of pulses necessary to decelerate the motor means is less than the number of time intervals for which there has been acceleration of the motor means, and wherein the determining and limiting the whole number of received pulses decreases the number of received pulse by one if the number of pulses to be transferred to the motor means less the number of pulses necessary to decelerate the motor means is less than the number of time intervals for which there has been acceleration of the motor means.

159. The invention as defined in claim 158 wherein the number of pulses remaining is, for each time interval, decreased by the number of time intervals for which there has been accleration and wherein the number of pulses necessary to decelerate the motor means to zero velocity is increased by the number of time intervals for which there has been acceleration of the motor means.

160. The invention as defined in claim 158 or 159 further comprising the step of determining the maximum velocity that the motor means is capable of responding to and wherein the determining and limiting the whole number of received pulses maintains the immediately previous value of the whole number of received pulses even if the number of pulses remaining to be transferred to the motor means less the number of pulses necessary to decelerate the motor means is greater than said multiple times the number of time intervals for which there has been acceleration of the motor means, provided that the pulse rate of said pulses if increased would be greater than the determined maximum velocity that the motor means is capable of responding to.

161. The invention as defined in claim 160 wherein said multiple is equal to the number 2.

162. The invention as defined in claim 150 wherein the determining and limiting the whole number of received pulses is further defined by increasing the number of received pulses by one for each time interval where the number of pulses remaining to be transferred to the motor means less the number of pulses necessary to decelerate the motor means to zero is greater than a multiple times the number of time intervals for which there has been acceleration of the motor means, wherein the determining and limiting the number of received pulses is set equal to the number of pulses remaining to be transferred to the motor means less the number of pulses necessary to decelerate the motor means to zero if the number of pulses remaining to be transferred to the motor means minus the number of pulses necessary to decelerate the motor means to zero is greater than the number of time intervals for which there has been acceleration of the motor means, and further wherein the determining and limiting the whole number of received pulses decreases the number of received pulses by one if the number of pulses to be transferred to the motor means less the number of pulses necessary to decelerate the motor means is less than the number of time intervals for which there has been acceleration of the motor means.

163. The invention as defined in claim 162 wherein the number of pulses remaining is, for each time interval, decreased by the number of time intervals for which there has been acceleration for those time intervals in which there is either acceleration of deceleration of the motor means, while for those time intervals for which there is neither acceleration nor deceleration of the motor means, the number of pulses remaining is set equal to the number of pulses necessary for the motor means to be decelerated to zero.

164. The invention as defined in claim 162 or 163 further comprising the step of determining the maximum velocity that the motor means is capable of responding to and wherein the determining and limiting the whole number of received pulses maintains the immediately previous value of the whole number of received pulses even if the number of pulses remaining to be transferred to the motor means less the number of pulses necessary to decelerate the motor means is greater than said multiple times the number of time intervals for which there has been acceleration of the motor means, provided that the pulse rate of said pulses if increased would be greater than the determined maximum velocity that the motor means is capable of responding to.

165. The invention as defined in claim 164 wherein said multiple is equal to the number 2.

166. The invention as defined in claim 150 wherein the determining and limiting the whole number of received pulses (NX) per time interval is further defined by determining the total number of pulses for which there is to be incremental movement of the motor means, initializing to zero the number of time intervals for which there has been acceleration (NC), initializing to zero the number of pulses necessary to decelerate the motor means to zero velocity (BN), and wherein the determined change in velocity that the motor means is capable of responding to while translating every pulse into a motor movement is defined by variable K, and wherein the determining and limiting the whole number of received pulses is further defined by increasing the rate of the pulses (VX) by the value of K if the number of pulses remaining to be transferred to the motor means (BL) less the number of pulses necessary to decelerate the motor means to zero (BN) is greater than a multiple times the number of time intervals for which there has been acceleration of the motor means (NC) and also if such condition occurs, increasing the value of BN by the value of NC and then increasing the value of NC by one, decreasing the value of BL by the value of NC and setting the number of received pulses (NX) equal to the value of NC, and wherein the determining and limiting the whole number of received pulses maintains the previous values of BN, NC, NX and VX and decreases the value of BL by the value of NC if the value of BL minus the value of BN is greater than the value of NC and wherein the value of NC is then decreased by one, the value of BN is decreased by the new value of NC, the value of VX is decreased by the value of K, and wherein the value of BL is then decreased by the new value of NC and the value of NX is set equal to the value of NC if BL minus BN is less than the value of NC.

167. The invention as defined in claim 166 further comprising the step of determining the maximum velocity (VM) that the motor means is capable of responding to and wherein the determining and limiting the whole number of received pulses maintains the immediately previous value of VX even if the number of pulses remaining to be transferred to the motor means (BL) less the number of pulses necessary to decelerate the motor means (BN) is greater than said multiple times the number of intervals for which there has been acceleration of the motor means (NC), provided that the new value of VX as increased by the value of K would be greater than the determined maximum velocity (VM) that the motor means is capable of responding to.

168. The invention as defined in claim 167 wherein said multiple is equal to the number 2.

169. The method for supplying information for controlling a movement of a digital motor means which is to be moved some desired number of incremental steps, comprising the steps of supplying the extent of the movement as a number of steps, dividing the duration of the movement into a plurality of consecutive time intervals, determining for consecutive time intervals the whole number of steps to occur during each time interval, with the number increasing numerically by a whole number for an accelerating movement during a time interval and decreasing numerically by a whole number for a decelerating movement during a time interval as compared with the number of steps in the immediately prior time interval, wherein the determining of the number of steps is based upon the number of steps remaining to be transferred to the motor means and the number of time intervals for which there has been acceleration of the motor means, and making available an electrical representation of the whole number of steps for each time interval.

170. The invention as defined in claim 169 in which the step of determining includes the step of determining the rate of the number of steps in each time interval and making available an electrical representation of the rate as a number for each time interval.

171. The invention as defined in claim 169 in which the step of determining includes the step of setting the rate by the interrelationship between the duration of the time interval and the number of steps determined for the interval.

172. A system for controlling the velocity of a motor means that produces an incremental movement essentially simultaneously with the receipt of a pulse comprising means for receiving a command of a movement consisting of a number of incremental movements and means for providing pulses to the motor means with the pulses being divided into a plurality of groups with said groups being serially supplied to said motor means and with each of said groups having a whole number of pulses and with the pulses in each group being at the same rate and in which the means for providing the pulses causes the number of pulses in a group to be made different by a whole number than the number in an adjacent group when the motor means is required to change its velocity, further wherein the means for providing pulses is based upon the number of pulses remaining to be provided to the motor means as originally established by the command and the number of time intervals for which there has been an increase in the velocity of the motor means.

173. The invention as defined in claim 172 in which the means for providing the pulses causes the rate of the pulses in each group to be varied between adjacent groups when the motor means is required to change its velocity.

174. The invention as defined in claim 172 in which the means for providing the pulses causes the time interval for each group to have a constant duration when the motor is changing its velocity.

175. The invention as defined in claim 172 in which the means for providing pulses may provide the same number of pulses in two different groups and in which the time distribution of the pulses in each group is the same.

176. A system for controlling the velocity of a motor means that produces an incremental movement essentially simultaneously with the receipt of a pulse, wherein the motor means is to be moved some desired number of incremental movements, comprising means for providing a first group of a whole number of pulses with the pulses having a constant rate, and means for providing a second group of a whole number of pulses during a time duration with the pulses of the second group having a constant rate but being different from the rate of the first group, the minimum time duration for the second group being a duration which is no less than the time required for the motor means to change its velocity to the rate of the pulses in the second group, wherein the means for providing the first group of pulses and the means for providing the second group of pulses if based upon the number of pulses remaining to be provided to the motor means and the number of time intervals for which there has been an increase in the velocity of the motor means.

177. The invention as defined in claim 176 in which the time duration of the second group approximates the time required for the motor means to change its velocity to the rate of the pulses in the second group.

178. A system for controlling the velocity of a motor means that translates each received pulse essentially simultaneously into an incremental movement, wherein the motor means is to be moved some desired number of incremental movements, comprising: means for determining the change of velocity that the motor means is capable of responding to while translating every pulse into a motor movement; means for determining for each of a plurality of consecutive time intervals the whole number of the received pulses with there normally being a plurality of pulses in an interval, means for limiting the difference in the number of the received pulses between adjacent time intervals to produce no more than the determined change of velocity with the difference being a whole number of pulses, wherein the means for determining and limiting the whole number of received pulses is based upon the number of pulses remaining to be transferred to the motor means, the number of time intervals for which there has been acceleration of the motor means, and the determined change of velocity that the motor means is capable of responding to while translating every received pulse into a motor movement; and means for supplying the determined number of pulses at an approximately even rate during each time interval.

179. The system as defined in claim 178 in which the means for determining includes means for changing the number of pulses between at least some adjacent time intervals.

180. The system as defined in claim 178 wherein the means for determining and limiting the whole number of received pulses further comprises means for increasing the mumber of received pulses by one for each time interval where the number of pulses remaining to be transferred to the motor means less the number of pulses necessary to decelerate the motor means to zero velocity is greater than a multiple times the number of time intervals for which there has been acceleration of the motor means, wherein the means for determining and limiting the whole number of received pulses limits the number of received pulses to the immediately previous time interval value of said received pulses if the number of pulses remaining to be transferred to the motor means less the number of pulses necessary to decelerate the motor means is less than the number of time intervals for which there has been acceleration of the motor means, and wherein the means for determining and limiting the whole number of received pulses decreases the number of received pulses by one if the number of pulses to be transferred to the motor means less the number of pulses necessary to decelerate the motor means is less than the number of time intervals for which there has been acceleration of the motor means.

181. The system as defined in claim 180 wherein the means for determining and limiting decreases, for each time interval, the number of pulses remaining by the number of time intervals for which there has been acceleration and increases the number of pulses necessary to decelerate the motor means to zero velocity by the number of time intervals for which there has been acceleration of the motor means.

182. The system as defined in claim 180 or 181 further comprising means for determining the maximum velocity that the motor means is capable of responding to and wherein the means for determining and limiting the whole number of received pulses maintains the immediately previous value of the whole number of received pulses even if the number of pulses remaining to be transferred to the motor means less the number of pulses necessary to decelerate the motor means is greater than said multiple times the number of time intervals for which there has been acceleration of the motor means, provided that the pulse rate of said pulses if increased would be greater than the determined maximum velocity that the motor means is capable of responding to.

183. The system as defined in claim 182 wherein the multiple is equal to the number 2.

184. The system as defined in claim 178 wherein the means for determining and limiting the whole number of received pulses includes means for increasing the number of received pulses by one for each time interval where the number of pulses remaining to be transferred to the motor means less the number of pulses necessary to decelerate the motor means to zero is greater than a multiple times the number of time intervals for which there has been acceleration of the motor means, wherein the means for determining and limiting the number of received pulses is set equal to the number of pulses remaining to be transferred to the motor means less the number of pulses necessary to decelerate the motor means to zero if the number of pulses remaining to be transferred to the motor means minus the number of pulses necessary to decelerate the motor means to zero is greater than the number of time intervals for which there has been acceleration of the motor means, and further wherein the means for determining and limiting the whole number of received pulses decreases the number of received pulses by one if the number of pulses to be transferred to the motor means less the number of pulses necessary to decelerate the motor means is less than the number of time intervals for which there has been acceleration of the motor means.

185. The system as defined in claim 184 wherein the means for determining and limiting decreases, for each time interval, the number of pulses remaining by the number of time intervals for which there has been acceleration for those time intervals in which there is either acceleration of deceleration of the motor means, while for those time intervals for which there is neither acceleration nor deceleration of the motor means, the number of pulses remaining is set equal to the number of pulses necessary for the motor means to be decelerated to zero.

186. The system as defined in claim 184 or 185 further comprising means for determining the maximum velocity that the motor means is capable of responding to and wherein the means for determining and limiting the whole number of received pulses maintains the immediately previous value of the whole number of received pulses even if the number of pulses remaining to be transferred to the motor means less the number of pulses necessary to decelerate the motor means is greater than said multiple times the number of time intervals for which there has been acceleration of the motor means, provided that the pulse rate of said pulses if increased would be greater than the determined maximum velocity that the motor means is capable of responding to.

187. The system as defined in claim 186 wherein said multiple is equal to the number 2.

188. The system as defined in claim 178 wherein the means for determining and limiting the whole number of received pulses (NX) per time interval includes means for determining the total number of pulses for which there is to be incremental movement of the motor means, means for initializing to zero the number of time intervals for which there has been acceleration (NC), means for initializing to zero the number of pulses necessary to decelerate the motor means to zero velocity (BN), and wherein the means for determining the change in velocity that the motor means is capable of responding to while translating every pulse into a motor movement is defined by variable K, and wherein the means for determining and limiting the whole number of received pulses includes means for increasing the rate of the pulses (VX) by the value of K if the number of pulses remaining to be transferred to the motor means (BL) less the number of pulses necessary to decelerate the motor means to zero (BN) is greater than a multiple times the number of time intervals for which there has been acceleration of the motor means (NC), and also if such condition occurs, increasing the value of BN by the value of NC and then increasing the value of NC by one, decreasing the value of BL by the value of NC and setting the number of received pulses (NX) equal to the value of NC, and wherein the means for determining and limiting the whole number of received pulses maintains the previous values of BN, NC, NX and VX and decreases the value of BL by the value of NC if the value of BL minus the value of BN is greater than the value of NC and wherein the value of NC is then decreased by one, the value of BN is decreased by the new value of NC, the value of NX is decreased by the value of K, and wherein the value of BL is then decreased by the new value of NC and the value of NX is set equal to the value of NC if BL minus BN is less than the value of NC.

189. The system as defined in claim 188 further comprising means for determining the maximum velocity (VM) that the motor means is capable of responding to and wherein the means for determining and limiting the whole number of received pulses maintains the immediately previous value of VX even if the number of pulses remaining to be transferred to the motor means (BL) less the number of pulses necessary to decelerate the motor means (BN) is greater than said multiple times the number of intervals for which there has been acceleration of the motor means (NC), provided that the new value of VX as increased by the value of K would be greater than the determined maximum velocity (VM) that the motor means is capable of responding to.

190. The system as defined in claim 189 wherein said multiple is equal to the number 2.

* * * * *